United States Patent
Osumi et al.

(10) Patent No.: US 10,262,510 B2
(45) Date of Patent: *Apr. 16, 2019

(54) DISPLAY SYSTEM AND GATE DEVICE

(71) Applicant: OMRON Corporation, Kyoto-shi, Kyoto (JP)

(72) Inventors: Yoshimasa Osumi, Kyoto (JP); Keiichiro Tanaka, Kusatsu (JP); Yuji Hirose, Kyotanabe (JP); Toshinori Yamasue, Koka (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/902,195

(22) Filed: Feb. 22, 2018

(65) Prior Publication Data
US 2018/0182213 A1 Jun. 28, 2018

Related U.S. Application Data

(63) Continuation of application No. PCT/JP2016/080680, filed on Oct. 17, 2016.

(30) Foreign Application Priority Data

Nov. 10, 2015 (JP) .................................. 2015-220601
Mar. 1, 2016 (JP) .................................. 2016-038857

(51) Int. Cl.
*B66B 3/00* (2006.01)
*F21V 8/00* (2006.01)
(Continued)

(52) U.S. Cl.
CPC .............. *G08B 7/066* (2013.01); *B66B 27/00* (2013.01); *G02B 6/006* (2013.01); *G02B 6/0036* (2013.01);
(Continued)

(58) Field of Classification Search
CPC ......... G08B 7/066; B66B 27/00; B66B 3/002; B66B 31/00; G02B 6/0036; G02B 6/0075; G02B 6/0095; G09F 13/005; G09F 19/12
(Continued)

(56) References Cited

U.S. PATENT DOCUMENTS

2018/0129061 A1* 5/2018 Shinohara ............... G02B 6/122
2018/0141487 A1* 5/2018 Osumi ..................... B60R 1/12
(Continued)

FOREIGN PATENT DOCUMENTS

JP  H10-162177 A  6/1998
JP  2000-123206 A  4/2000
(Continued)

OTHER PUBLICATIONS

An English translation of the International Search Report of PCT/JP2016/080680 dated Jan. 10, 2017.
(Continued)

*Primary Examiner* — Daryl C Pope
(74) *Attorney, Agent, or Firm* — Metrolexis Law Group, PLLC

(57) ABSTRACT

A display system is provided with a display device; the display device including: a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element. The display
(Continued)

device presents information as an image, e.g., as a stereoscopic image.

23 Claims, 47 Drawing Sheets

(51) Int. Cl.
  *G08B 7/06* (2006.01)
  *B66B 27/00* (2006.01)
  *B66B 31/00* (2006.01)
  *G09F 13/00* (2006.01)
  *G09F 13/18* (2006.01)
  *G09F 19/00* (2006.01)
  *G09F 19/12* (2006.01)

(52) U.S. Cl.
  CPC ......... *G02B 6/0075* (2013.01); *G02B 6/0076* (2013.01); *G02B 6/0095* (2013.01); *G09F 13/005* (2013.01); *G09F 13/18* (2013.01); *G09F 19/12* (2013.01); *B66B 3/002* (2013.01); *B66B 31/00* (2013.01)

(58) Field of Classification Search
  USPC .................................. 340/815.4, 438, 425.5
  See application file for complete search history.

(56) References Cited

U.S. PATENT DOCUMENTS

2018/0146519 A1* 5/2018 Osumi ................ G02B 6/0001
2018/0180792 A1* 6/2018 Shinohara ............... G09F 13/18

FOREIGN PATENT DOCUMENTS

| JP | 2004-51356 A | 2/2004 |
| JP | 2005-41621 A | 2/2005 |
| JP | 2011-20757 A | 2/2011 |
| JP | 5701434 B1 | 4/2015 |

OTHER PUBLICATIONS

An English translation of the Written Opinion of PCT/JP2016/080680 dated Jan. 10, 2017.

* cited by examiner

FIG. 58A
FIG. 58B
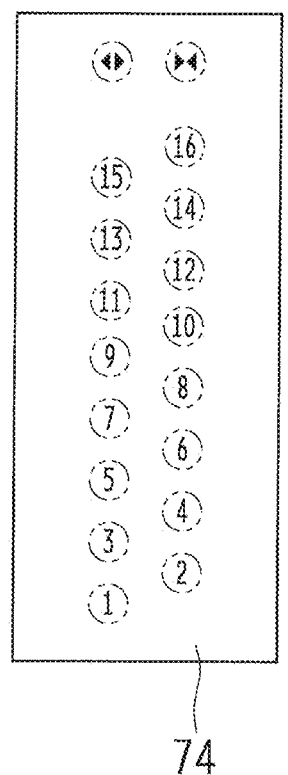
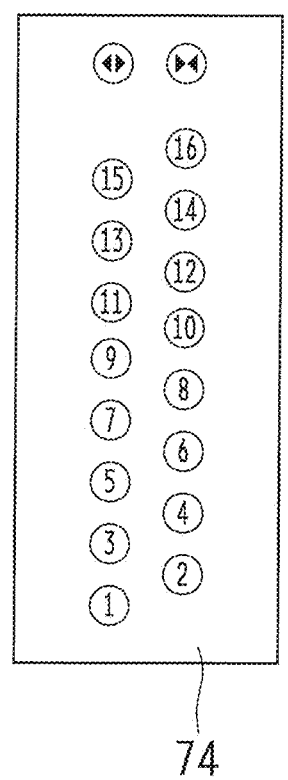

DISPLAY SYSTEM AND GATE DEVICE

CROSS REFERENCE TO RELATED APPLICATIONS

This application is a continuation application of International Application No. PCT/JP2016/080680, filed on Oct. 17, 2016, which claims priority based on the Article 8 of Patent Cooperation Treaty from prior Japanese Patent Application No. 2016-038857, filed on Mar. 1, 2016 and prior Japanese Patent Application No. 2015-220601, filed on Nov. 10, 2015, the entire contents of all of which are incorporated herein by reference.

FIELD

The disclosure relates to a display system placed in an area used for entry or movement, and a gate device capable of employing such a display system.

BACKGROUND

Gate systems for checking entry and exit, such as automatic ticket gates and security gates are increasing in popularity. Automatic ticket gates, for instance are installed in public facilities such as train stations or airports, at security areas (security checkpoints), and at boarding gates. Security gates are installed, for instance, at the entry to a building such as office building or an event site.

In these kinds of gate systems may display a variety of information such as an entry point, an indicator of the position to hold an IC-chip enabled commuter pass, or the results of verifying an entry or exit for a variety of reasons such as for guidance, to provide an alert, or to disseminate information. Information may be provided on stickers, may be printed or may be painted. For instance, Patent Document 1 discloses a display device in an automatic ticket machine that presents information on a screen lowered from the ceiling and on a display unit that uses LEDs.

RELATED ART DOCUMENTS

[Patent Document 1] Japanese Unexamined Patent Publication No. 2000-123206

SUMMARY

Technical Problem

In terms of existing means of presenting information as exemplified in Patent Document 1, there is a need to improve the ability to draw the attention of and further improve the so-called eye-catching nature of a presentation for a traveler approaching, entering, passing through, and boarding a system for managing entry and movement such as a gate system.

One or more embodiments provide a display system that employs a display device provided with a light source and a light guide element to present images such as three-dimensional images and thereby show highly arresting information presented as images.

One or more embodiments also provide a gate device that uses a display system according to one or more embodiments.

Solution to Problem

To address the foregoing, a display system described herein is arranged in a region designated for entry or movement. The display system including: a display device configured to show an image; the display device including: a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element.

In the display system the light guide element is configured to form an image so that the image is visible at a position prior to entering the region.

In the display system the light guide element is configured to form an image indicating whether or not entry is permitted.

The display system further includes an assessment device for determining whether or not passage through the region is permitted; the assessment device includes a read unit for acquiring information needed for assessing whether or not passage is permitted; and the light guide element is arranged overlapping the read unit.

In the display system the light guide element is configured to form an image so that the image is visible from a position in the region.

The display system further includes an assessment device for determining whether or not passage through the region is permitted; wherein the light guide element is configured to form an image representing the determination result from the assessment device.

The display system may include: a plurality of the display devices; and a first light guide element in a first display device is configured to form an image so that the image is visible at a position prior to entering the region; a second light guide element in a second display device is configured to form an image so that the image is visible from a position in the region; an assessment device for determining whether or not passage through the region is permitted; the assessment device includes a read unit configured to acquire information needed to assess whether or not passage is permitted; the first light guide element is arranged overlapping the read unit; and the second light guide element is configured to form an image representing the determination result from the assessment device.

The display system may further include: a detection unit configured to detect the approach of a detection object; and the light source may emit light when the detection unit detects the approach of a person.

In the display system, one of the display devices may be provided with a plurality of light guide elements; and the light guide elements may be configured to form mutually different images.

In the display system, the light guide element may be arranged in the region.

The display system may include a door unit provided in the region; and the light guide element may be arranged in the door unit.

In the display system, the light guide element may be a thin film and may be bent.

The region may include a passage, and the display system may further include a gate device configured as a boundary of the passage on one or both sides of the passage.

In the display system, the light guide element may be arranged in the gate device.

The gate device in the display system may include a wall unit arranged parallel to the travel direction through the region and standing orthogonal to a floor surface; and the wall unit may be formed using the light guide element.

The wall unit in the display system may be transparent of semi-transparent.

In the display system the region may contain a lift-type or horizontal type moving unit that includes an endless crawler driven tread, inner panels arranged on both sides in the movement direction of the tread, and endless crawler driven automatic handrail configured to travel around the inner panels.

In the display system, the light guide element may be arranged below the automatic handrail.

In the display system, the light guide element may be arranged along a surface curved in the movement direction of the automatic handrail.

In the display system the inner panels may be formed using the light guide element.

The region in the display system may be configured to include a lift device

Additionally, a display system described herein is arranged in a region designated for entry or movement. The display system may include: a display device configured to show an image; the display device including: a light source configured to emit light; and a light guide element configured to guide incident light from the light source; the light guide element including: an emission surface configured to output incident light; and an optical-path changing portion configured to change the path of the incident light toward the emission surface; the optical-path changing portion changes the optical path of toward a position prior to entering the region or to a position in the region.

A gate device described herein is configured for arrangement on one or both sides of a passage as the boundary of the passage. The gate device including: a display device configured to show an image; the display device including: a light source configured to emit light; and a light guide element configured to guide incident light from the light source; the light guide element including: an emission surface configured to output incident light; and a plurality of light focusing portions configured to change the path of the incident light toward the emission surface, causing the light output to converge toward a convergence point or convergence line outside the light guide element or to radiate from a convergence point or convergence line outside the light guide element and thereby form an image outside the light guide element.

The display system and the gate device described herein are capable of presenting very noticeable information, i.e., so-called eye-catching information that draws the attention of a traveler.

Effects

One or more embodiments are provided with a display device including a light source and a light guide element, and cause the display device to present an image such as a three-dimensional image. Hereby, the gate system and the like exhibit superior benefits such as the ability to present very noticeable information, i.e., so-called eye-catching information that draws the attention of a traveler approaching, entering, passing through, and boarding the gate system.

BRIEF DESCRIPTION OF THE DRAWINGS

FIG. 58A is a front view schematically illustrating an example of adopting a display system according to one or more embodiments; and FIG. 58B is a front view schematically illustrating an example of adopting a display system according to one or more embodiments.

DETAILED DESCRIPTION

One or more embodiments are described in detail with reference to the drawings. Note that the following one or more embodiments are merely working examples and in no way limit the technical character of the present invention.

Principle Behind the Display Device

Figure 1:
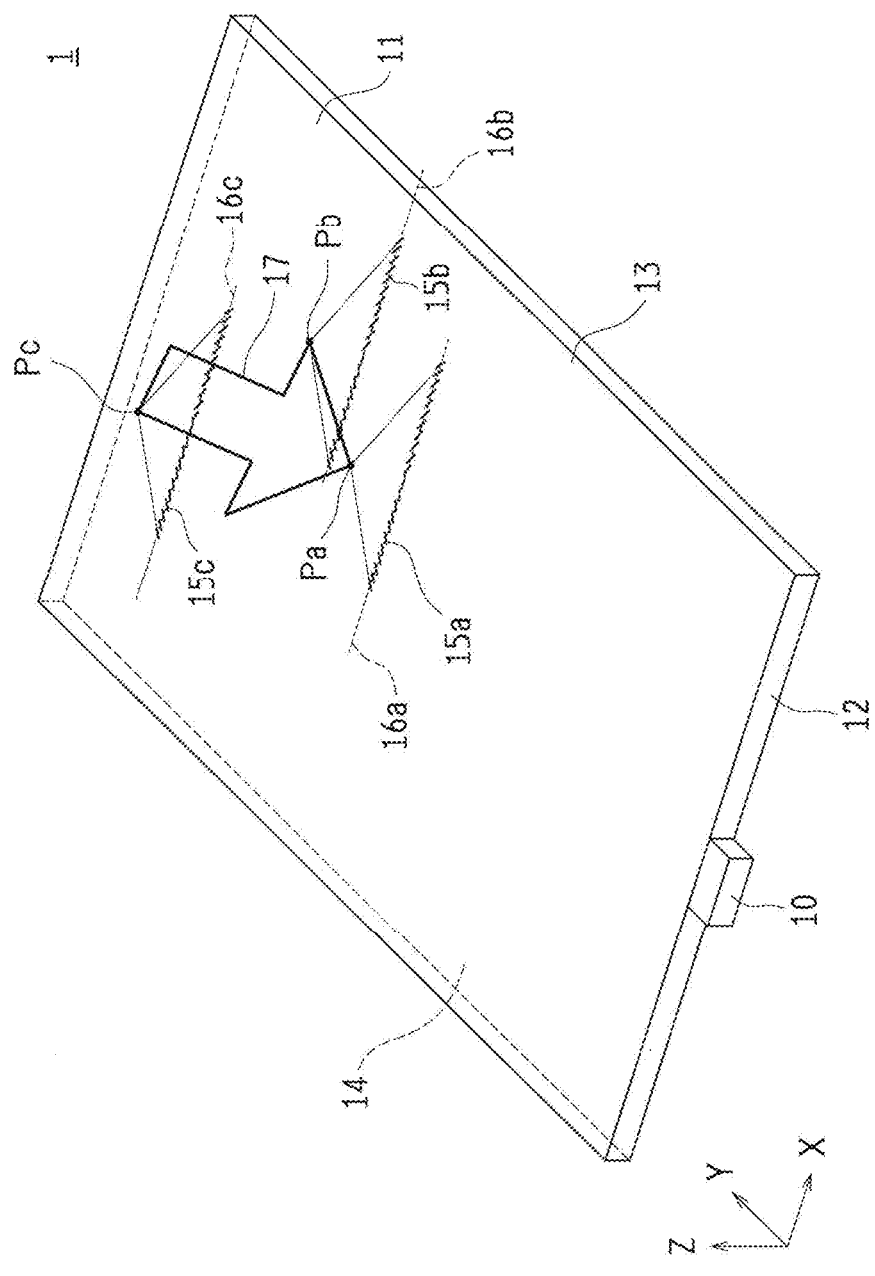
FIG. 1 is a diagram illustrating a display device in a display system according to one or more embodiments and schematically illustrating the display device along with an image formed in a space.

A display system according to one or more embodiments may be provided as a system setup in a given area for entry or movement, e.g., as a gate system or a travel system. For instance, automatic ticket gates, such as the automatic ticket gates installed in public facilities such as train stations or airports, at security checkpoints (safety inspection points police?), and at boarding gates, and security gates installed, for instance, at the exit of a building such as office building, or an event sites may be adopted in systems as entry and exit gates for checking entry and exit. That is, a gate system includes a passage to a region designated for entry or movement with an installation such as the later-described gate device provided at one or both ends of the passage as a boundary. Additionally, for instance, the gate system may be adopted in an elevator, escalator, moving walk (moving walkway), or the like to create a movement system. In other words, the movement system may be provided with an installation such as an endless crawler driven tread, lift, or the like for entry or movement through an area. The display system according to one or more embodiments includes a built in display device configured to display an image; the display system is capable of providing a variety of visual effects such as through creating an image by causing light to converge in a space by way of the display device. First, the principle allowing the display device to produce an image in a space is described. FIG. 1 is for describing a display device in a display system according to one or more embodiments and schematically illustrates the display device along with an image formed in a space. Note that the drawings are provided as outlines or schematic views to facilitate a simple and easy-to-understand description. There are also cases where the drawings referenced in the description contain elements that are not drawn to scale in terms of the horizontal and vertical proportions or the spaces between components.

The light emitting device 1 is provided with a light source 10 that emits light and a light guide plate 11 (light guide element) that guides the incident light from the light source 10. The light source 10 may be configured using a light emitting element such as an LED with the light emitted from the light source 10 entering the light guide plate 11. The light guide plate 11 may be formed from a flexible thin-film material or curable sheet into a rectangular panel-like shape using a transparent resin having a high refractive index such as a polycarbonate (PC) resin or poly methyl methacrylate (PMMA) resin, or using an inorganic material such as glass. Here "panel like" indicates an object that is shorter (thinner) in the thickness direction (Z axis direction) than in the planar direction spreading out in two dimensions (XY plane) orthogonal to the thickness direction. That is, while the light guide plate 11 is a rectangular parallelepiped, the length thereof in the thickness direction (Z axis direction) is less than the length in a plane spreading out in two dimensions and formed by the longitudinal direction (X axis direction) and the transverse direction (Y axis direction).

The light source 10 is installed at one end surface in the longitudinal direction of the light guide plate 11. That is, one of the surfaces making up the short side of the rectangle in the thickness direction is the incidence end surface 12 where light emitted from the light source 10 enters the light guide plate 11. The light guide plate 11 causes light entering therein from the incidence end surface to spread out in planar form. The panel-like light guide plate 11 includes an emission surface 13 configured to emit incident light entering from the light source 10 and a rear surface 14 relative to and across from the emission surface 13.

In the description that follows, the rectangular coordinate system, and in particular the right-handed system of x axis, y axis, and z axis is used as necessary. The X axis is the transverse direction of the light guide plate 11, i.e., the direction along the short side of the rectangle. The Y axis is the longitudinal direction of the light guide plate 11, i.e., the direction along the long side of the rectangle, where the direction from the incidence end surface 12 toward the end surface facing the incidence end is the positive direction. The Z axis is the thickness direction of the light guide plate 11, where the direction from the rear surface 14 to the emission surface 13 is the positive direction. The light guide plate 11 may be used in a non-planar way, e.g., may be bent for use. In this case, the surface including the main portion of the emission surface 13 or a neighboring surface may be used as a reference for the X axis, Y axis, and Z axis.

A plurality of light focusing portions 15 is formed on the rear surface 14 of the light guide plate 11; the light focusing portions 15 are represented as light focusing portions 15a, 15b, 15c, . . . in the drawings. The light focusing portions 15 are situated along the progressive path of incident light entering from the incidence end surface; that is, the light focusing portions 15 adjust the optical path of the incident light toward the emission surface 13. Here, the light focusing portions 15 are illustrated as optical surfaces formed inside the light guide plate 11, and in this particular case, as reflection surfaces 150 (FIG. 2: 150x, 150y; and FIG. 3: 150x1,150x2, 150x3) that reflect incident light entering from the incidence end surface 12. Oblique notches may be cut into the rear surface 14 with the inclined surfaces serving as the reflection surfaces 150. The reflection surfaces 150 of the light focusing portions 15 are formed as substantially continuous in the X axis direction. More specifically, the plurality of light focusing portions 15a fall along a line 16a, the plurality of light focusing portions 15b fall along a line 16b, and the plurality of light focusing portions 15c fall along a line 16c. The other light focusing portions 15 (not shown) are formed in the same manner. Here the lines 16 (lines 16a, 16b, 16c, . . . ) are virtual straight lines extending substantially parallel to the X axis on the rear surface 14. Any given light focusing portion 15, 15, . . . is formed as substantially continuous along a straight line 16 that is substantially parallel to the X axis direction. The incident light entering the light guide plate 11 is guided toward the light focusing portions 15, 15, . . . lined up along the X axis direction.

The light focusing portions 15 include components such as the reflection surfaces 150 for changing the optical path. The reflection surface 150 in a light focusing portion 15 changes the path of incident light causing the light to exit from the emission surface 13 and substantially converge at convergence point P corresponding to the light focusing portion 15. FIG. 1 depicts a portion of the light focusing portions 15, namely, light focusing portions 15a,15b,15c, . . . ; more specifically, FIG. 1 depicts the plurality of light rays with paths changed by each of the light focusing portions 15a, 15b, 15c, . . . converging at convergence points Pa, Pb, Pc respectively. Each of the light focusing portions 15 cause the light rays to converge at convergence points P to form an image, thus forming an image 17.

More specifically, the plurality of light focusing portions 15 on any of the lines 16a, 16b, 16c, . . . may correspond to a convergence point P in the image 17. The plurality of light focusing portions 15 in any given line 16 may change the optical path of the light rays emanating from the positions of the light focusing portions 15 when light reflects from the optical surfaces, e.g., from the reflection surfaces 150; hereby the light rays exit from the emission surface 13 and converge at a convergence point P. Therefore, the wavefront of light from the plurality of light focusing portions 15 becomes a wavefront that appears to radiate from the convergence point P. For example, the plurality of light focusing portions 15a on the line 16a corresponds to a convergence point Pa in the image 17. The light focusing portions 15a change the optical path of the light rays guided toward the plurality of light focusing portions 15a on the line 16a, and thus the light rays exit from the emission surface 13 and converge at the convergence point Pa. Light reflected by the plurality of light focusing portions 15 along other lines 16 converge identically at convergence points P. Thus, any desired light focusing portion 15 can provide a wavefront of light so that light appears to radiate from the corresponding convergence point P. The convergence points P correspond to mutually different light focusing portions 15. A grouping of a plurality of convergence points P that correspond to each of the light focusing portions 15 produces a visible image 17 in a space. The display device 1 thus projects the image 17 as a three-dimensional image in a space. The image 17 depicted in FIG. 1 is drawn as a three-dimensional image with lines; the lines used to draw the image 17 are produced by grouping a plurality of convergence points P corresponding to each of the light focusing portions 15.

The display device 1 forms an image with light exiting from the emission surface 13 to produce the image 17 as a spectroscopic image. The image 17 is a spectroscopic image that is visible in a space to an observer. Note that in this specification, the term spectroscopic image refers to an image 17 that appears to be at a location that is different from the emission surface 13 external to the display device 1. The term spectroscopic image is not limited to a three-dimensional image and includes a two-dimensional image perceived at a location separate from the efficient surface 13 of the display device 1, for instance. In other words the term "spectroscopic image" does not refer only to an image perceived as having a solid shape, but also includes the image 17 in two-dimensional form perceived at a different location than on emission surface 13 of the display device 1 and represents an image 17 that appears to be protruding from the light guide plate 11 of the display device 1.

The light guided by the light guide plate 11 is oriented in a direction connecting locations in the light guide plate 11 and the light source 10 while not including a spread component orthogonal to a direction connecting locations in the light guide plate 11 and the light source 10. The light focusing portions 15 may be provided at locations separated from the light source 10; in this case, the light guided by the light guide plate 11 is oriented generally towards the Y axis direction from the location at which the light focusing portion is provided but does not spread in the X axis direction. Therefore, light from the light focusing portion 15 substantially converges onto a single convergence point P in a plane parallel to the XZ plane that includes the convergence point P.

When light entering the light focusing portions 15 spread in the Z axis direction, the light from the light focusing portions 15 converge on a convergence line along the Y axis in a space containing the convergence point P. However, the description of the embodiment focuses on the convergence of light in the XZ plane to facilitate understanding of the embodiment and describes the same as light from the light focusing portions 15 converging on the convergence points P.

Figure 2:
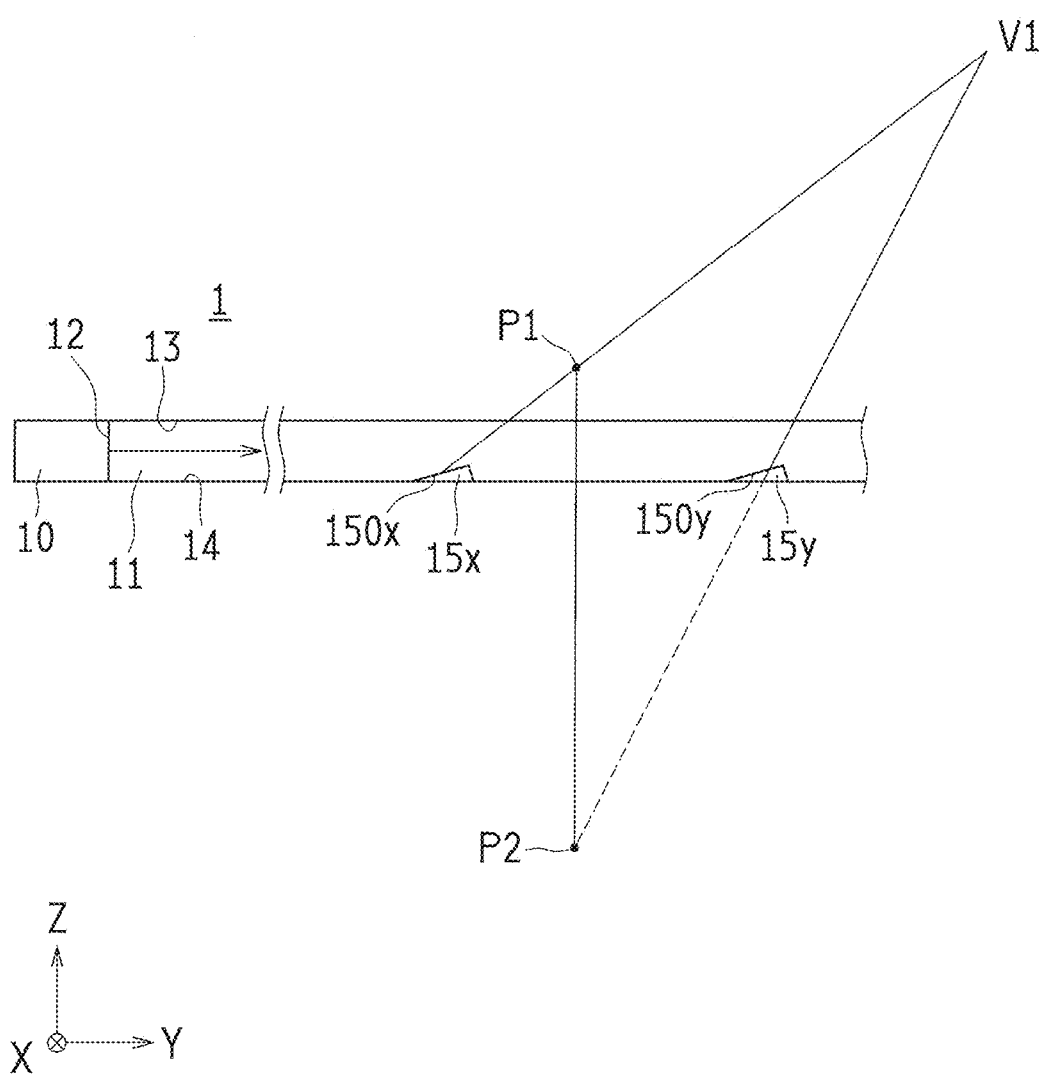
FIG. 2 is a conceptual diagram illustrating a cross section of a display device in a display system according to one or more embodiments and an optical path.
Figure 3:
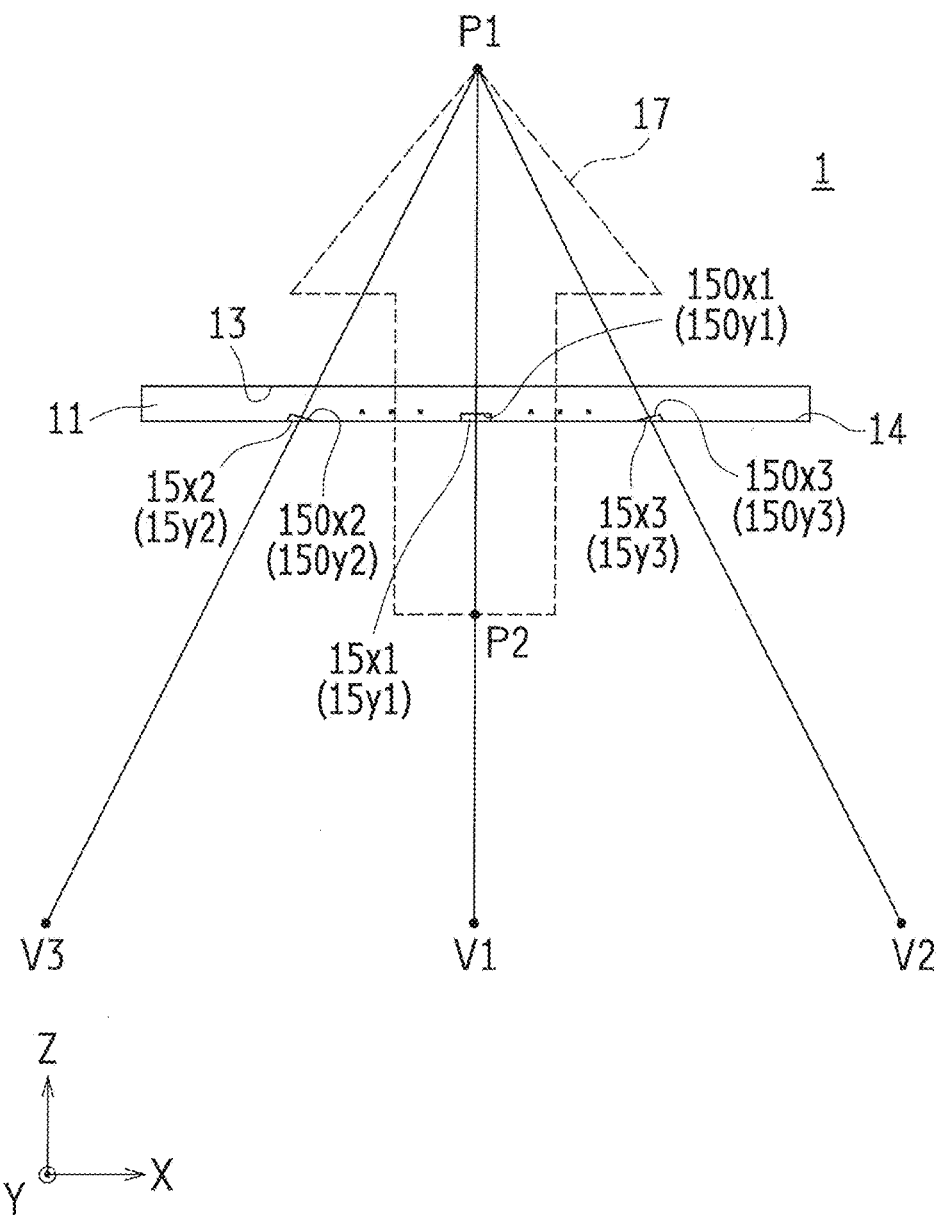
FIG. 3 is a conceptual diagram illustrating a cross section of a display device in a display system according to one or more embodiments and an optical path.

FIG. 2 and FIG. 3 are conceptual diagrams outlining a cross section of the display device 1 in a display system according to one or more embodiments and an optical path; FIG. 2 illustrates a cross-section parallel to the YZ plane, and FIG. 3 also illustrates the image 17 viewed by an observer of a cross-section parallel to the XZ plane. FIG. 2 and FIG. 3 illustrate not only the emission surface 13 of the light guide plate 11 (i.e., the positive Z axis direction), but also provides an example of the image 17 representing an arrow that also spreads at the rear surface 14 (negative Z axis direction). In the examples illustrated in FIG. 2 and FIG. 3, the image 17, which represents an arrow, appears with the front portion of the arrow protruding from the emission surface 13 and the rear portion of the arrow protruding from the rear surface 14.

As illustrated in FIG. 2, the light source 10 is installed at the incidence end surface 12 of the light guide plate 11, and the incidence end surface 12 and the emission surface 13 are substantially orthogonal. Additionally, the rear surface 14 faces the emission surface 13, and the rear surface 14 is also substantially orthogonal to the incidence end surface 12. The rear surface 14 is a flat surface substantially parallel to the emission surface 13 and is provided with inclined surfaces that form the reflection surfaces 150 (150x, 150y) of the light focusing portions 15 (15x, 15y). The flat rear surface 14 along with the emission surface 13 directs the incident light entering the light guide plate 11 from the incidence end surface 12 via total internal reflection therebetween and function to spread the light in the light guide plate 11 in planar form. The inclined reflection surfaces 150 of the light focusing portions 15 reflect the incident light entering the light guide plate 11 to thereby adjust the optical path of the light toward the emission surface 13.

That is, the light emitted from the light source 10 and incident on the light guide plate 11 from the incidence end surface 12 is repeatedly totally reflected between the emission surface 13 and the rear surface 14 trapped within the light guide plate 11 and propagates therethrough in planar form. On arriving at a reflection surface 150 forming the light focusing portion 15, the light propagating through the light guide plate 11 is reflected by the reflection surface 150 and exits to the outside from the emission surface 13.

As illustrated in FIG. 2 and FIG. 3, the plurality of light focusing portions 15x (light focusing portions 15x1, 15x2, 15x3, . . . ) located on a line 16 include reflection surfaces 150x1, 150x2, 150x3, . . . , respectively. The reflection surfaces 150x1, 150x2, 150x3, . . . corresponding to the plurality of light focusing portions 15x located along the line 16 reflect light toward the emission surface 13 in a direction converging at a convergence point P1 near the emission surface 13. A plurality of light focusing portions 15y (light focusing portions 15y1,15y2, 15y3, . . . ) is located on another line 16 and also include reflection surfaces 150y1, 150y2, 150y3, . . . , respectively. The reflection surfaces 150y1, 150y2, 150y3 corresponding to the plurality of light focusing portions 15y located along the other line 16 reflect light toward the emission surface 13 toward a direction where the light radiates from a convergence point P2 near the rear surface 14. Therefore, the incline of the reflection surface 150y2 of the light focusing portion 15y2 and the reflection surface 150y3 of the light focusing portion 15y2 (written in parenthesis in FIG. 3) are the opposite direction in FIG. 3 and are inclined toward the end surface of the light guide plate 11.

The reflection surfaces 150x (e.g., the reflection surfaces 150x1, 150x2, 150x3, . . . ) each reflects light from the light source 10 in a direction along a line connecting a point on each of the reflection surfaces 150x and the convergence point P1. The light rays reflected from the reflection surfaces 150x converge at the convergence point P1. Thus, the plurality of reflection surfaces 150x in the corresponding light focusing portions 15x reflects incident light entering from the light source 10 in a direction along a line connecting a point on each of the reflection surfaces 150x and the convergence point P1. Therefore, the display device 1 can supply light from the convergence point P1 oriented toward any of the positions in a range from a position V2 through a position V1 and up to position V3. A convergence point P1 of this kind produces the image 17 which appears to protrude from near the emission surface 13.

The reflection surfaces 150y (e.g., the reflection surfaces 150y1, 150y2, 150y3) each reflects incident light entering from the light source 10 in a direction along a line connecting a point on each of the reflection surfaces 150y and the convergence point P2. The light rays reflected from the reflection surfaces 150y may be extended in a direction opposite the direction the light rays travel, in which case the extension line from the light rays converge at the convergence point P2. Thus, the plurality of reflection surfaces 150y in corresponding light focusing portions 15y reflects incident light entering from the light source 10 in a direction along a line connecting a point on each of the reflection surfaces 150 and the convergence point P2. Therefore, the display device 1 can supply light from the convergence point P1 oriented toward any of the positions in a range from a position V2 through a position V1 and up to position V3. A convergence point P2 of this kind produces the image 17 which appears to protrude from the opposite side of emission surface 13 (i.e., near the rear surface 14).

As above described, the light guide plate 11 includes a plurality of light focusing portions 15 having mutually different convergence points P, where a grouping of a plurality of convergence point P including a convergence point P1 and a convergence point P2 produces an image 17 that serves as a stereoscopic image. That is, the light guide plate 11 is provided with a plurality of light focusing portions 15 which change the path of incidence light toward an emission surface 13 causing the light output to converge toward an external convergence point or convergence line or to radiate from an external convergence point or convergence line and thereby form an image externally. By grouping a plurality of convergence points P and convergence lines, the display device 1 can thus form an image 17 outside the light guide plate 11 that can be perceived by an observer as a stereoscopic image.

In other words, the following kinds of statements can be made. Light emitted from a light source 10 enters a light guide plate 11, and the light guide plate 11 guides light within a plane parallel to the emission surface 13. A plurality of light focusing portions 15 is formed on the light guide plate 11; the light focusing portions 15 lengthen in a direction (i.e., the X axis direction) orthogonal to the direction (Y axis direction) in which the light guide plate guides light within a plane parallel to the emission surface 13. Each of the light focusing portions 15 includes optical surfaces where the direction of the normal line thereof projected onto a surface parallel to the emission surface varies continuously or gradually along the length direction (X axis direction) of the light focusing portions 15. The light guided by the light guide plate 11 reflects from the optical surfaces whereby the light exits as emission light from the emission surface 13 in a direction to substantially converge on a single convergence point P or convergence line in a space, or to substantially radiate from a single convergence point P or convergence line. The convergence points P or convergence lines are mutually different for the plurality of light focusing portions 15 at different positions along the Y axis, and grouping a plurality of convergence points P or convergence lines produces an image 17 in a space.

FIG. 2 and FIG. 3 and the corresponding descriptions illustrate a stereoscopic image that appears to protrude from both the emission surface 13 and the rear surface 14; this is used to describe the basic principles behind producing a stereoscopic image. However, as illustrated in FIG. 1 the stereoscopic image may appear to protrude from near only one surface.

The reflection surfaces 150 here serve as the light focusing portions 15. However, the light focusing portions 15 can have various forms so long as the light focusing portions 15 can change the path of incident light traveling through the light guide plate 11. For instance, the light focusing portion 16 may be formed as a cylindrical Fresnel lens, whereby the refraction effect of the refraction surface of the Fresnel lens (i.e. the prism surface) changes the path of the incident light. Additionally, in this case the Fresnel lens may be constituted by a plurality of parts with gaps therebetween. The light focusing portions 15 may also be formed as a diffraction grating whereby the diffraction effect may change the path of the incident light. Moreover, the reflection effect and the refraction effect of the prism may change the optical path of the incident light.

Additionally, the distances between all the convergence points P and emission surface 13 may be non-uniform. In this case, the density of converging light is configured to increase as the distance from the emission surface 13 increases when forming an image 17 that spreads for instance three dimensionally, or when forming a two-dimensional image 17 that contains a plane obliquely intersecting the emission surface 13. Hereby, any blurring in the image 17 formed is substantially uniform, making it possible to create an image 17 that does not make the observer uneasy.

Furthermore, while the light emitted from the light source 10 is represented as incident light entering the light guide plate 11 from the incidence and surface 12 which is one in surface in the longitudinal direction of the light guide plate 11, the incident light is not limited thereto. For example, the rear surface 14 may be taken as the light incidence surface and appropriately designed so that light enters the light guide plate therefrom.

Additional Principles Behind the Display Device

Figure 4:
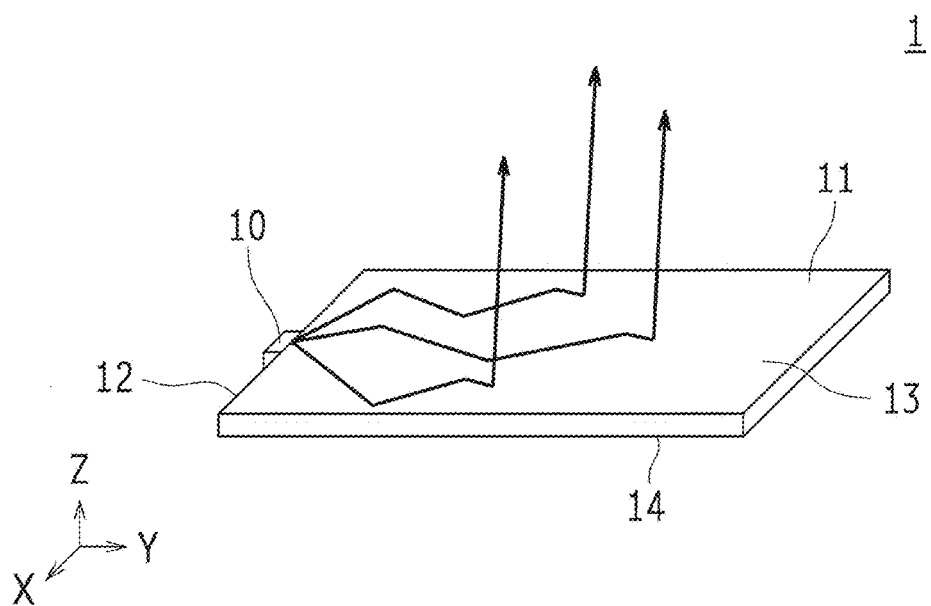
FIG. 4 is a diagram illustrating a display device in a display system according to one or more embodiments and schematically illustrating the display device.
Figure 5:
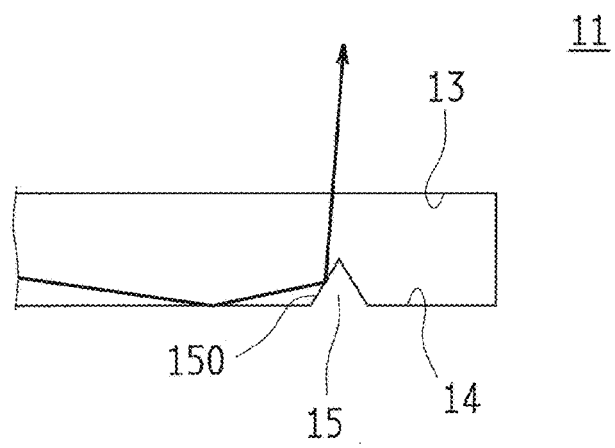
FIG. 5 is a conceptual diagram illustrating a cross section of a display device in a display system according to one or more embodiments and an optical path.

The display device 1 described with reference to FIG. 1 through FIG. 3 is capable of presenting the image 17 as a three-dimensional stereoscopic image that can be visible at a location distinct from the emission surface 13; in addition, the display device 1 can also present the image 17 as a two-dimensional planar image on the emission surface 13. The display device 1 capable of presenting the two-dimensional image 17 is described. FIG. 4 is for outlining the display device 1 provided to a display system according to one or more embodiments; And FIG. 5 is a conceptual diagram outlining a cross section of a display device in the display system according to one or more embodiments and an optical path; Note that the drawings are provided as outlines or schematic views to facilitate a simple and easy-to-understand description. There are also cases where the drawings referenced in the description contain elements that are not drawn to scale in terms of the horizontal and vertical proportions or the spaces between components. The configurations identical to the display device 1 presenting a stereoscopic image are given identical reference numerals, and the descriptions thereof are omitted.

The display device 1 is provided with a light source 10 and a light guide plate 11. The light source 10 is installed at one end surface in the longitudinal direction of the light guide plate 11, with the one end surface serving as the incidence end surface 12. Light emitted from the light source 10 enters the light guide plate 11 through the incidence end surface 12. The light guide plate 11 includes an emission surface 13 configured to emit incident light and a rear surface 14 opposite to the emission surface 13.

A plurality of optical-path changing portions 15 is formed on the rear surface 14 of the light guide plate 11. Note that the structure of the light focusing portions 15 in the display device 1 that presents the image 17 is a planar image is identical to the light focusing portions 15 in the display device 1 that present the image 17 as stereoscopic image; therefore, for convenience these are described as the light focusing portions to 15. However, the plurality of lights focusing portions 15 in the display device 1 represents the image is a planar image are formed as optical-path changing portions; the optical-path changing portions change the path of incident light entering from the incidence end surface 12 toward the emission surface 13 at a predetermined angle. That is, the plurality of light focusing portion each reflects light toward the same direction so the light becomes parallel without converging. FIG. 5 depicts an example where the reflection surface 150 in the light focusing portions 15 is an inclined surface cut obliquely from the rear surface 14, and where the light focusing portion 15 changes the path of light toward the emission surface 13 at a predetermined angle.

Thus, the light emitted from the light source 10 and incident on the light guide plate 11 from the incidence end surface 12 is repeatedly totally reflected between the emission surface 13 and the rear surface 14 trapped within the light guide plate 11 and propagates therethrough in planar form. On arriving at a reflection surface 150 forming the light focusing portion 15, the light propagating through the light guide plate 11 is reflected by the reflection surface 150 and exits to the outside from the emission surface 13. Creating light focusing portions 15 in the light guide plate 11 as appropriate allows an image 17 to be presented in a direction determined by the angle of the reflection surfaces 150 and as a planar image determined by the location at which the light focusing portions 15 are formed.

Gate System

Figure 6:
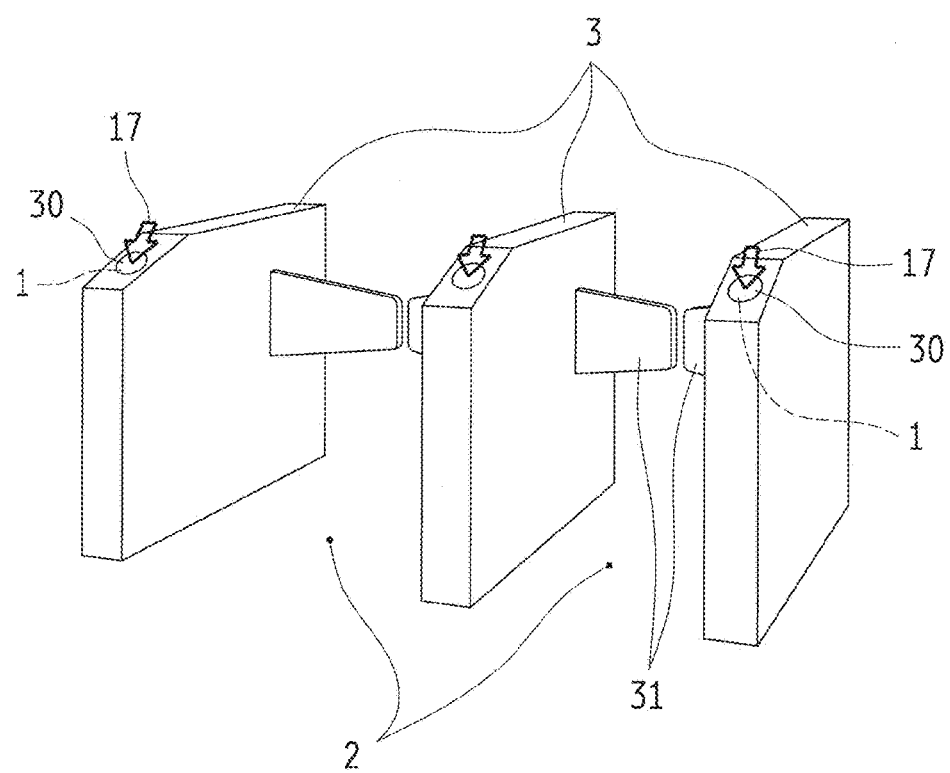
FIG. 6 is a perspective view schematically illustrating the external features of an example of adopting a display system according to one or more embodiments.

An example of adopting a display system equipped with the above described display device 1 as a gate system is described. FIG. 6 is perspective view schematically illustrating the external features of an example of adopting the display system according to one or more embodiments. FIG. 6 depicts a gate system adopted as an entrance or exit gate such as an automatic ticket gate, or security gate. The gate system includes a gate device 3 installed at one or both ends of a passage 2, which is a region where persons that must enter or exit must pass to enter or move through. The gate device 3 is arranged as a boundary of the passage 2. The gate device 3 is provided with a display device 1, a read the unit 30, and a door unit 31. As previously described the display unit display device 1 presents an image 17 at a location perceivable to a passing person; the read unit 30 reads information needed for determining whether or not to permit passage; and the door unit 31 is a flat door or the like for controlling passage.

Figure 7:
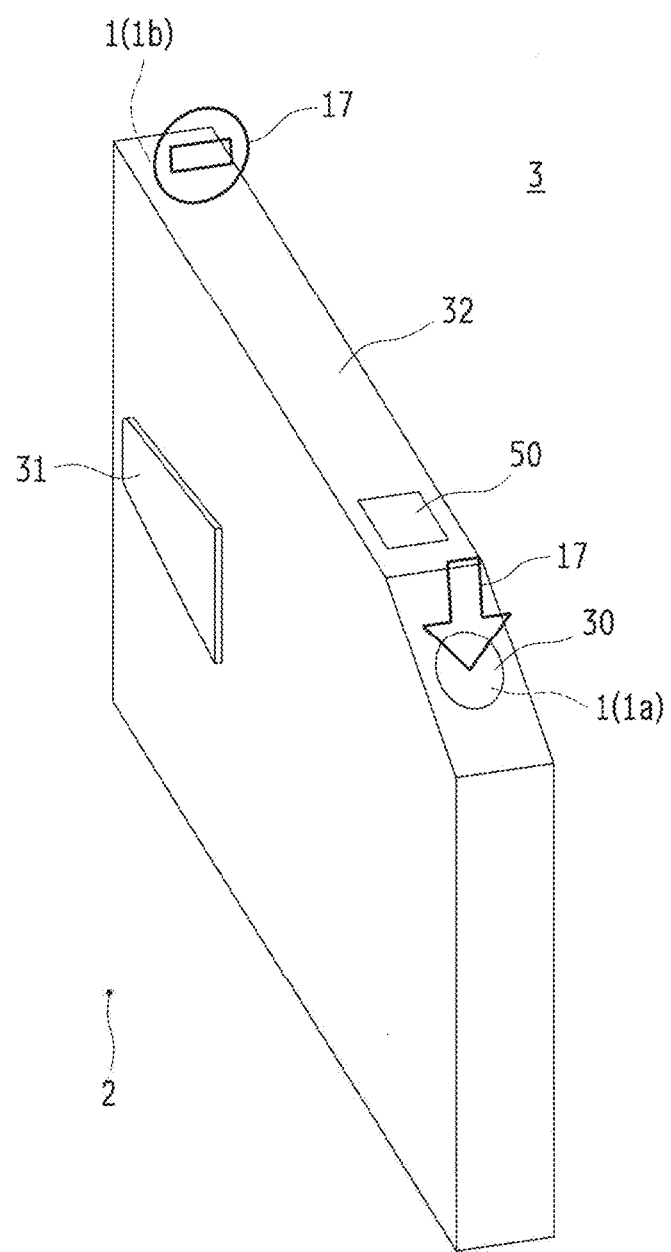
FIG. 7 is a perspective view schematically illustrating the external features of a gate device in a display system according to one or more embodiments.

FIG. 7 is perspective view schematically illustrating the external features of a gate device 3 in the display system according to one or more embodiments. The gate device 3 is provided with an enclosure 32 that stands as the boundary of the passage 2; the enclosure 32 is rectangular and may be roughly one meter high, two meters long, and thirty centimeters wide. Note that the gate device 3 depicted in FIG. 7 includes two units of the previously described display device 1 and is further provided with a liquid crystal screen capable of presenting various kinds of information. In the description that follows, the two display devices 1 are referred to distinctly as a first display device 1a and a second display device 1b as necessary; further, the device including the liquid crystal screen is described as a display unit 50.

The upper surface of the enclosure 32 includes the first display device 1a, the display unit 50, and the second display device 1b arranged in that order from the entrance. The first display device 1a may present the image 17 as an arrow indicating the location to which to bring a recognizable media such as an IC enabled commuter pass, or a card with a predetermined indicia thereon such as a two-dimensional bar-code or the like. The display unit 50 may present an image indicating information such as the amount remaining on a prepaid (charge) type card such as "Balance: 7000 yen", or the like. The second display device 1b may present an image 17 indicating the results of a determination of whether or not permit passage through the passage 2.

A door unit 31 such as a flat door is a range on the side surface along the passage 2 of the enclosure 32. The door unit 31 is open when passages is permitted, and is closed when traffic is not permitted. For example, a gate device 3 may be arranged at a place with a large amount of traffic such as on a ticket gate in a train station. The door unit 31 may normally remain open and operated to close when traffic is not permitted. Additionally, for example, the gate device 3 may be arranged as a security gate in an office building and provided to improve security by restricting entry. The door unit 31 in this gate device 3 may be normally closed and operated to open when passage is permitted.

Figure 8:
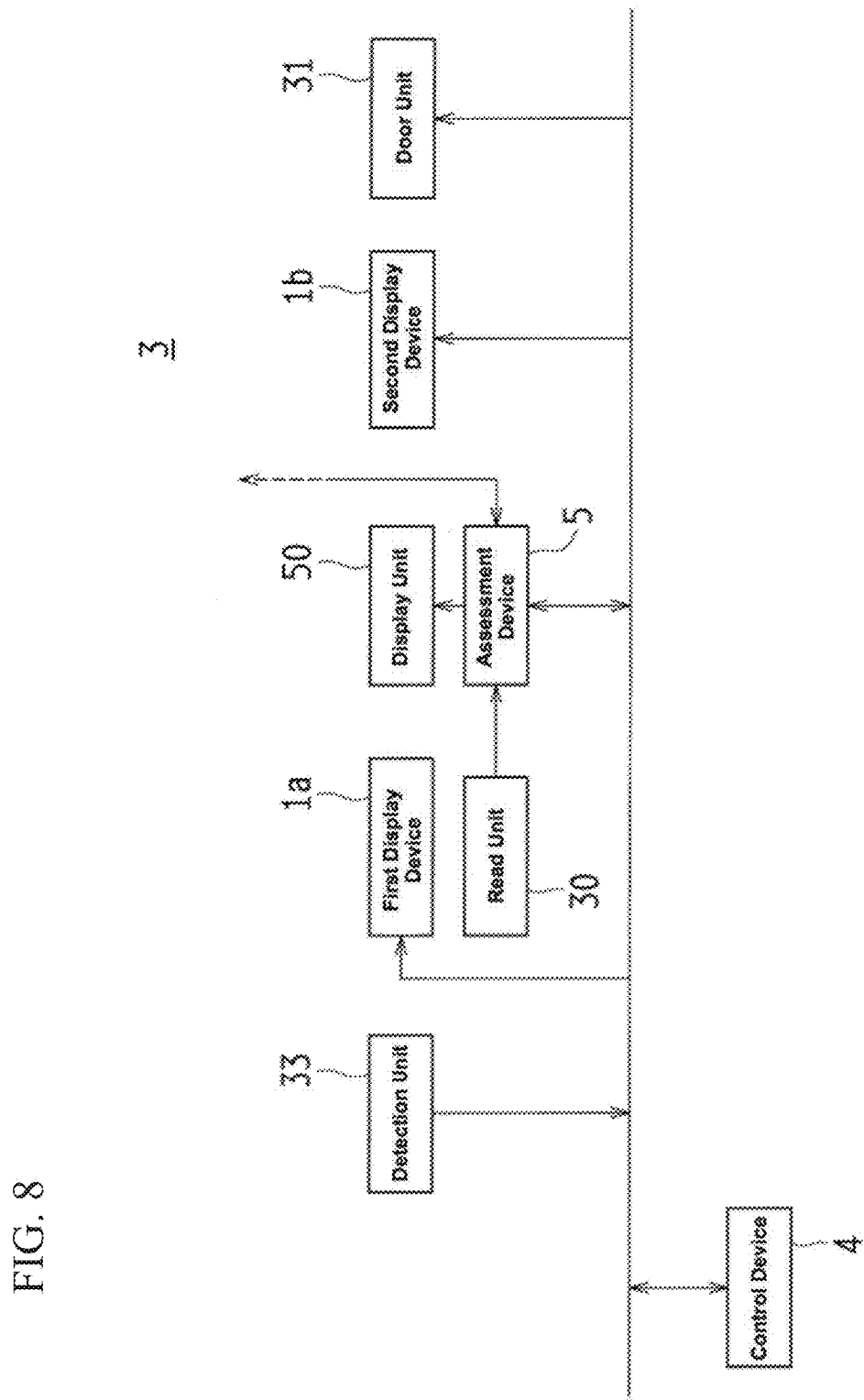
FIG. 8 is a block diagram schematically illustrating an example of the control structure in a gate device provided to a display system according to one or more embodiments.

FIG. 8 is a block diagram schematically illustrating an example of the control structure in the gate device 3 provided to the display system according to one or more embodiments. The gate device 3 is equipped with a control device 4 such as a built-in computer configured for overall control; the control device 4 controls various components such as a detection unit 33, the first display device 1a, the read unit 30, an assessment device 5, the second display device 1b, and the door unit 31.

The detection unit 33 may be a motion sensor or the like for detecting the approach of a detection target such as a person. The detection unit 33 outputs a detection signal to the control device 4 on detecting the approach of the detection target to the gate device 3.

The first display device 1a may present a two-dimensional or three-dimensional image 17 at a location for bringing a medium for example, on receiving a display signal output from the control device 4 which received a detection signal.

The read unit 30 may be a device such as an IC card reader or a barcode reader for reading ID data provided on an IC-chip enabled commuter pass, and for acquiring authentication information such as a predetermined indicia in the form of, for instance, a two-dimensional barcode on the card as the information needed for determining whether or not to allow permit passage. The read unit 30 is arranged overlapping with the light guide plate 11 in the first display device 1a at the location indicated to by the image 17 presented by the first display device 1a.

The assessment device 5 authenticates on the basis of the authentication information acquired by the read unit 30, and determines whether or not to permit passage on the basis of the authentication result. The assessment device 5 may be configured to access a management device (not shown)

arranged in the zone in which the gate device 3 is provided or a management device arranged in another region, and to have the management device determine whether or not to permit passage.

The assessment device 5 outputs the results of determining whether or not passage is permitted, and a signal representing information such as a balance or the like to the display unit 50 which is connected as an auxiliary device. The display unit 50 presents various information on the basis of the information received. The assessment device 5 also transmits a signal to the control device representing the result of determining whether or not passage is permitted.

The control device 4 enters a display signal in the second display device 1b on the basis of the determination result signal; the second display device 1b presents a two-dimensional or three-dimensional image 17 representing whether or not passage is permitted on receiving the display signal.

The control device 4 inputs a shutter signal in the door unit 31 on the basis of the determination result signal. The door unit 31 carries out a predetermined open or close operation on receiving the shutter signal.

Figure 9:
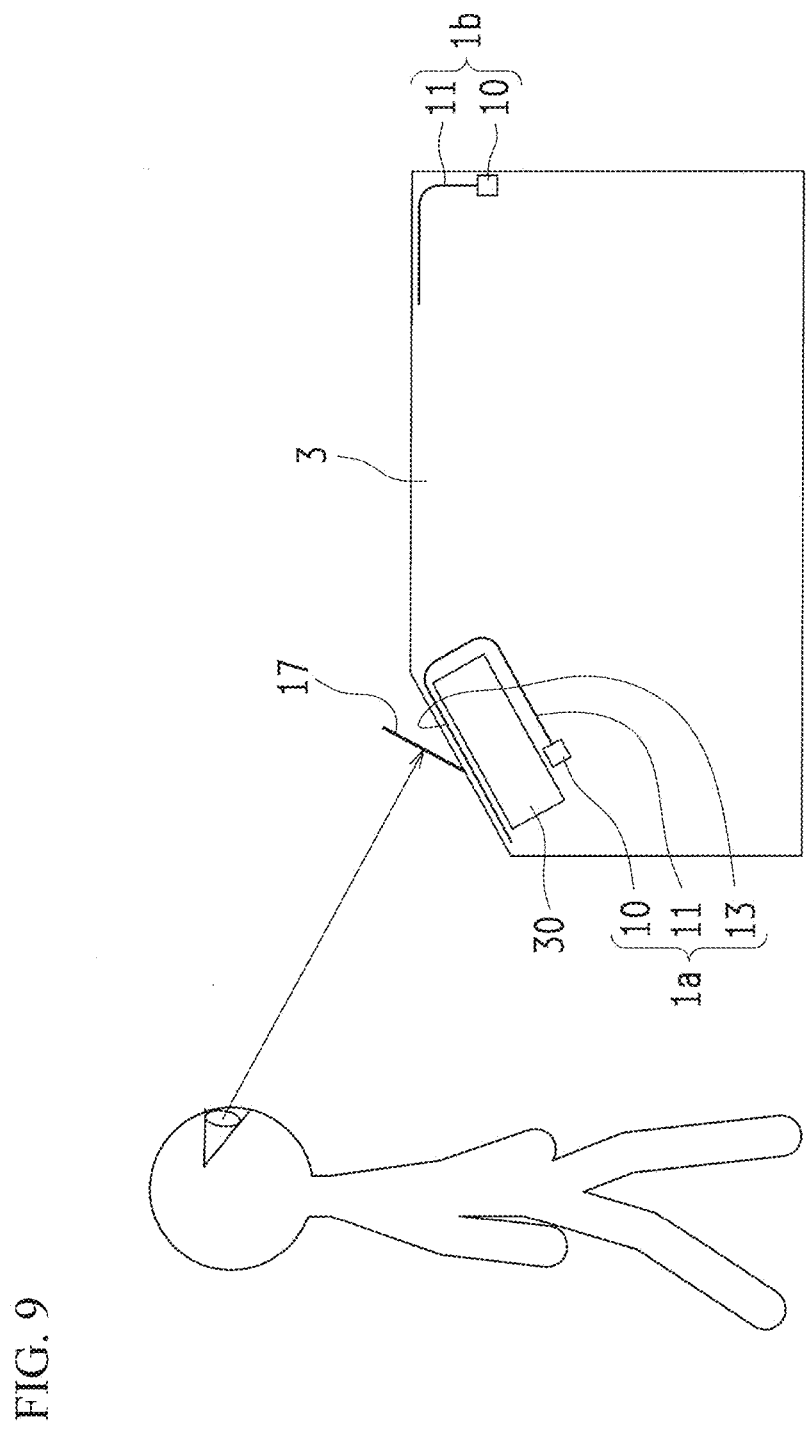
FIG. 9 is a schematic view illustrating a gate device in a display system according to one or more embodiments.

FIG. 9 is a schematic view of the gate device 3 in the display system according to one or more embodiments; FIG. 9 depicts when a traveler approaches the gate system in order to pass through the gate system. The detection unit 33 detects the approach of a traveler as the traveler attempts to pass through the gate system. As an example, the detection range may be established as a few meters before entry into the gate system. On detecting the approach the detection unit 33 outputs a detection signal to the control device 4, and the control device 4 outputs a display signal to the first display device 1a. The first display device 1a causes the light source 10 to emit light. Light incident on the light guide plate 11 exits from the emission surface 13 and forms an image 17 as a stereoscopic image that is visible from a position prior to entry into the passage 2 of the gate system. The image 17 presented via image formation is shown at a location and in a form that is easily seen by a traveler located a few meters in front of the gate system. For instance, the image 17 is presented as a stereoscopic image with a spread plane that is at right angles relative to the gaze of a traveler who is roughly 1 m and 60 cm tall.

The traveler enters the gate system and brings the IC chip enabled commuter pass toward the region unit 30 in accordance with the image 17 that is presented. The light guide plate 11 in the first display device 1a is configured from a flexible thin-film and is arranged overlapping with the read plane of the reef unit 30 so that the read position of the read unit 30 is near the image 17 that is presented.

Figure 10:
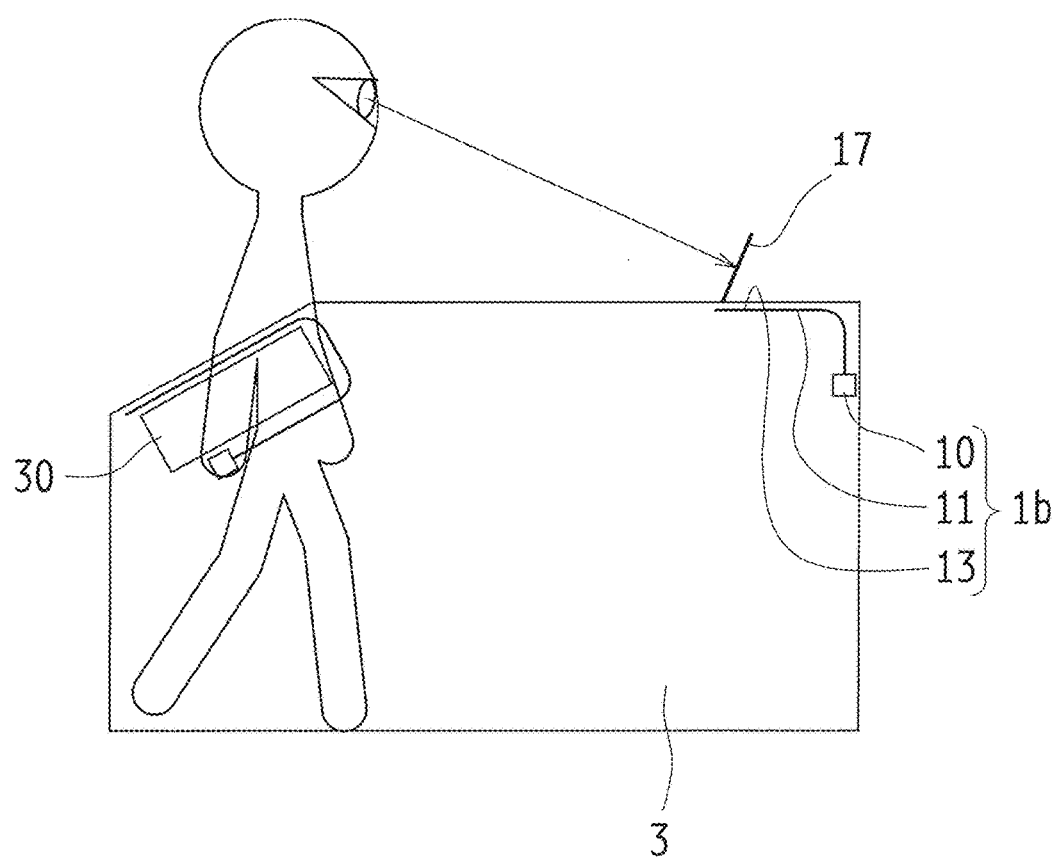
FIG. 10 is a schematic view illustrating a gate device in a display system according to one or more embodiments.

FIG. 10 is a schematic view of the gate device 3 in the display system according to one or more embodiments; FIG. 10 depicts a traveler passing through the gate system. The assessment device 5 determines whether or not to permit passage on the basis of the credentials acquired by the read unit 30, and outputs the determination result signal to the control device 4. The control device 4 outputs a display signal to the second display device 1b. The second display device 1b causes the light source 10 to emit light. Light incident on the light guide plate 11 exits from the emission surface 13 and forms an image 17 as a stereoscopic image that is visible from a position in the passage 2 of the gate system. The image 17 presented via image formation is shown at a location and in a form that is easily seen by a traveler moving through the passage 2. For instance, the image 17 is presented as a stereoscopic image with a spread plane that is at right angles relative to the gaze of a traveler who is roughly 1 m and 60 cm tall. The stereoscopic image presented is the determination result from the assessment device 5, in other words, it is the image 17 indicating whether or not passage is permitted.

Figure 11:
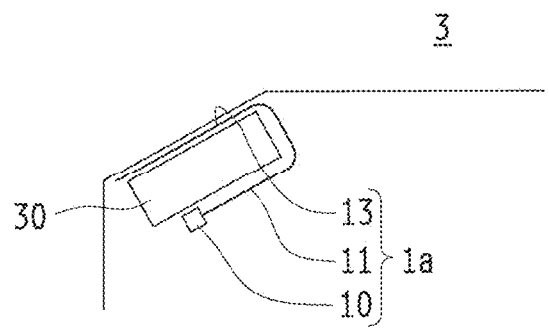
FIG. 11 is a diagram schematically illustrating an example of implementing a first display device and a read unit in a gate device provided to a display system according to one or more embodiments.

FIG. 11 schematically illustrates an example of implementing a first display device 1a and a read unit 30 in the gate device 3 provided to the display system according to one or more embodiments. The light guide plate 11 in the first display device 1a is configured from a flexible thin-film and is arranged overlapping with the read plane of the reef unit 30 so that the read position of the read unit 30 is near the image 17 that is presented. The emission surface 13 of the light guide plate 11 is oriented towards the top portion of the gates device 3; the emission surface 13 may be protected by a glass or a transparent protective panel such as a hardened resin or the like. The light source 10 is arranged at the back surface of the read unit 30, and so the traveler cannot see the light source 10. Light emitted from the light source 10 in the first display device 1a is directed through the light guide plate 11, and arrives opposite to the moving direction of the traveler relative to the light focusing portions 15 in the light guide plate 11. The light focusing portions 15 reflect the light at an obtuse angle oriented toward the traveler. Having the light focusing portions 15 reflect light at an obtuse angle allows the light focusing portions 15 to easily change the optical path and facilitates design.

Figure 12:
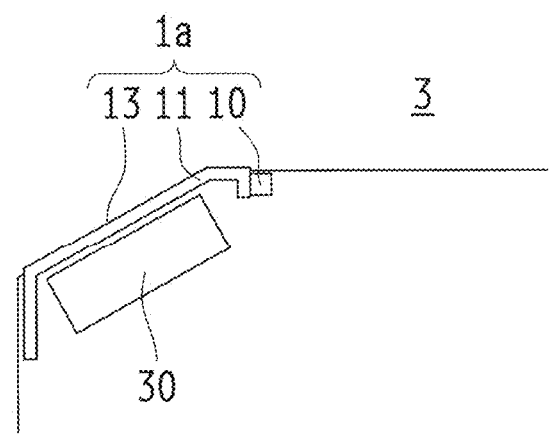
FIG. 12 is a diagram schematically illustrating an example of implementing a first display device and a read unit in a gate device provided to a display system according to one or more embodiments.

FIG. 12 schematically illustrates an example of implementing the first display device 1a and the read unit 30 in a gate device 3 provided to the display system according to one or more embodiments; FIG. 12 depicts another form of the gate device 3. The gate device 3 illustrated in FIG. 12 does not include the protective plate that protects the first display device 1a and the read unit 30. The emission surface 13 of the light guide plate 11 in the first display device 1a serves as a protected plate and is exposed. The light guide plate 11 which is left exposed as a protective plate may be formed from a hardened resin material or inorganic material or the like.

Figure 13:
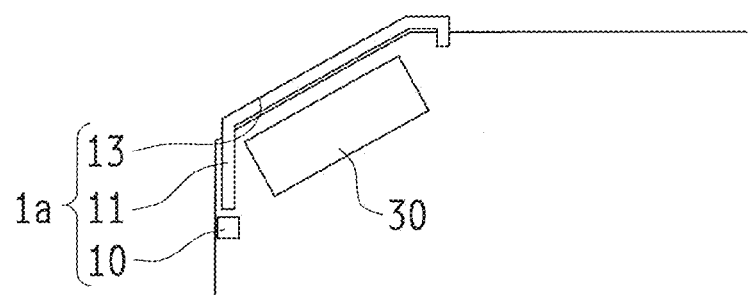
FIG. 13 is a diagram schematically illustrating an example of implementing a first display device and a read unit in a gate device provided to a display system according to one or more embodiments.

FIG. 13 schematically illustrates an example of implementing a first display device 1a and a read unit 30 in a gate device 3 provided to the display system according to one or more embodiments. FIG. 13 depicts another form of the gate device 3. The location of the light source 10 is different in the gate device 3 depicted in FIG. 13, compared to the form depicted in FIG. 12.

Figure 14:
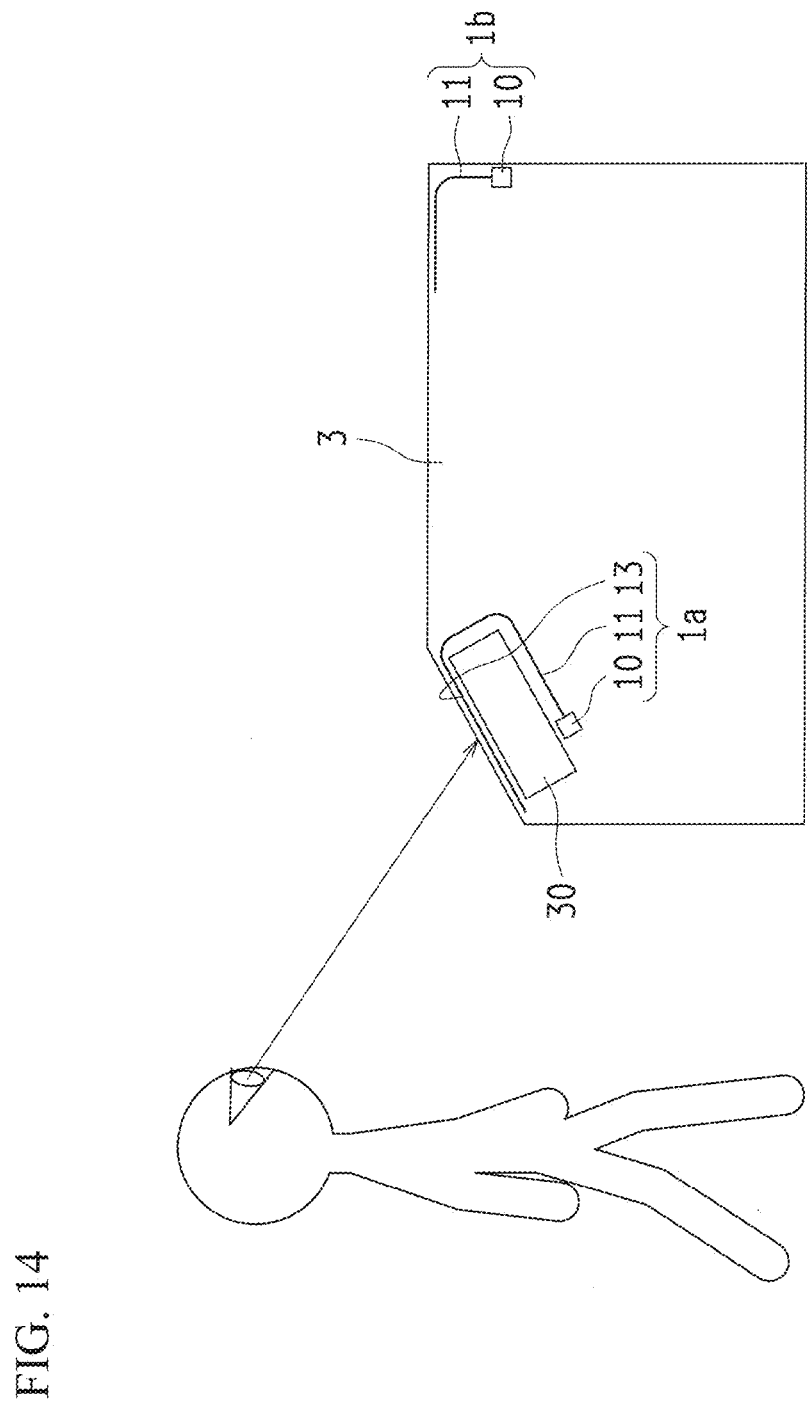
FIG. 14 is a schematic view illustrating a gate device in a display system according to one or more embodiments.

FIG. 14 is a schematic view of a gate device 3 in the display system according to one or more embodiments; In FIG. 14, the first display device 1a and the second display device 1b present a two-dimensional planar image 17. The first display device 1a illustrated in FIG. 14 adjusts the angle at which light exits from the emission surface 13 of the light guide plate 11 to present the image 17 as a brighter two-dimensional planar image in relation to the gaze of a traveler about to enter the passage 2 of the gate system. The second display device 1b illustrated in FIG. 14 adjusts the angle at which light exits from the emission surface 13 of the light guide plate 11 to present the image 17 as a brighter two-dimensional planar image in relation to the gaze of a traveler about to enter the passage 2 in the gate system.

Using the Side Surfaces of the Gate Device 3

Figure 15:
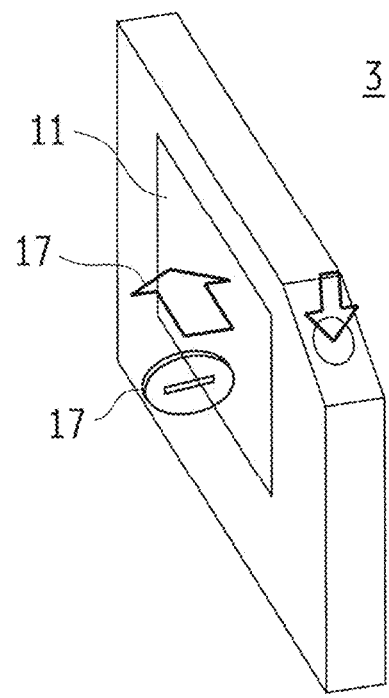
FIG. 15 is a perspective view schematically illustrating an example of how an image may be presented in a gate device provided to a display system according to one or more embodiments.

FIG. 15 is a perspective view schematically illustrating an example of how an image may be presented in a gate device 3 provided to the display system according to one or more embodiments. In FIG. 15 the light guide plate 11 in the first display device 1a provided to the gate device 3 is arranged on the side surface of the gate device 3, which stands substantially vertical relative to the floor surface. The floor surface is substantially parallel to the passage 2. Additionally, the light guide plate 11 is configured to present the image 17 as a plurality of different types of stereoscopic images. For the sake of convenience, and imaged 17 representing that traffic is permitted through the passage 2, and an image 17 representing that traffic is not permitted are both depicted. However, only one of these types of images 17 is selectively presented during actual operation. In the example depicted in FIG. 15, the light guide plate 11 in the first display device 1a is arranged at the side surface of the gate device 3; the image 17 is presented at the side part of the gate 3 above the passage 2 as a stereoscopic image representing whether or not traffic is permitted. The stereoscopic image is presented so that the image 17 is visible from a position before entering the passage 2; whether or not entry is permitted to the passage 2 is visible to a traveler before the traveler enters the passage 2. The first display device 1a may be configured to present such an image 17 prior to entry to the passage 2 to indicate whether or not passage is permitted as illustrated in FIG. 15. In addition, the second display device 1b may be configured to present the result of determining whether or not passage is permitted. The image 17 is preferably presented near the exit of the passage 2 when the image 17 represents the determination result, as it is necessary for a traveler passing through the passage 2 to see the image.

Figure 16:
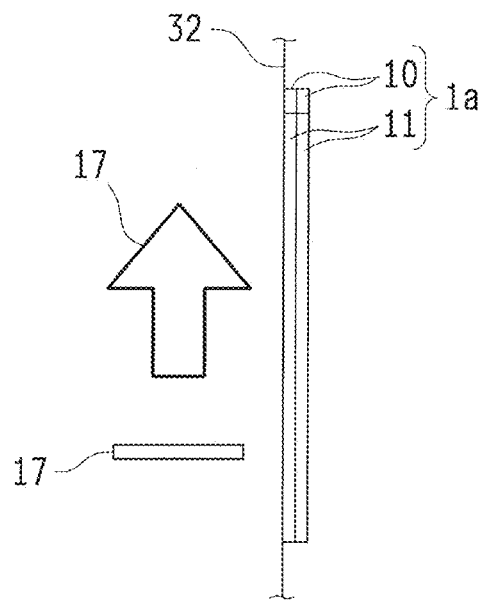
FIG. 16 is a diagram schematically illustrating a portion of the internal structure of a gate device provided to a display system according to one or more embodiments, and an example of an image presented thereby.

FIG. 16 schematically illustrates a portion of the internal structure of the gate device 3 provided to the display system according to one or more embodiments, and an example of an image 17 presented thereby. FIG. 16 is a plan view of the internal configuration of a gate device 3 similar to that illustrated in FIG. 15, where the image 17 is presented as a stereoscopic image next to the gate device 3. The first display device 1a is provided with two groups of light sources 10 and light guide plates 11 on the side surface of the enclosure 32 of the gate device 3. The two groups of light guide plates 11 overlap and light from the light sources 10 arranged at the further end of the passage 2 enters the light guide plates 11. The light guide plates 11 change the path of incident light entering therein and cause the emission surface 13, which is positioned toward the passage 2 to emit light. Hereby the light guide plates 11 present an image 17 as a stereoscopic image next to the gate device 3. The light guide plates 11 arranged toward the passage 2 are transparent; and, by establishing the appropriate number and location of the light focusing portions 15, the overlapping light guide plates 11 may emit light without any obstructions. One of the two light sources 10 selectively emits light; hereby the image 17 corresponding to that light source 10 is selectively shown. The gate device 3 depicted in FIG. 15 and in FIG. 16 may not only present the image 17 next to the gate device 3 but may also present the image 17 above the gate device 3. In either case the gate device 3 is configured with overlapping light guides 11 and a plurality of images 17 that may be selectively presented.

Figure 17:
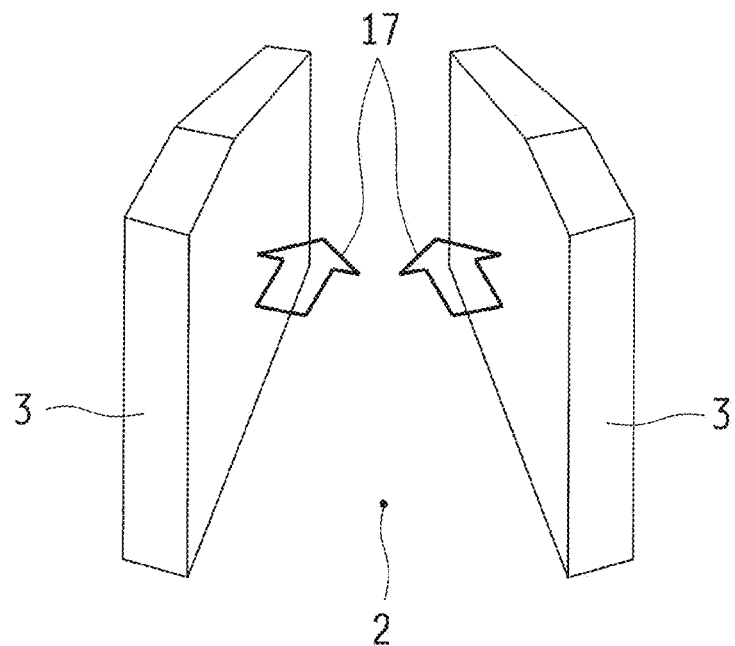
FIG. 17 is a diagram schematically illustrating a gate device provided to a display system according to one or more embodiments, and an example of an image presented thereby.
Figure 18:
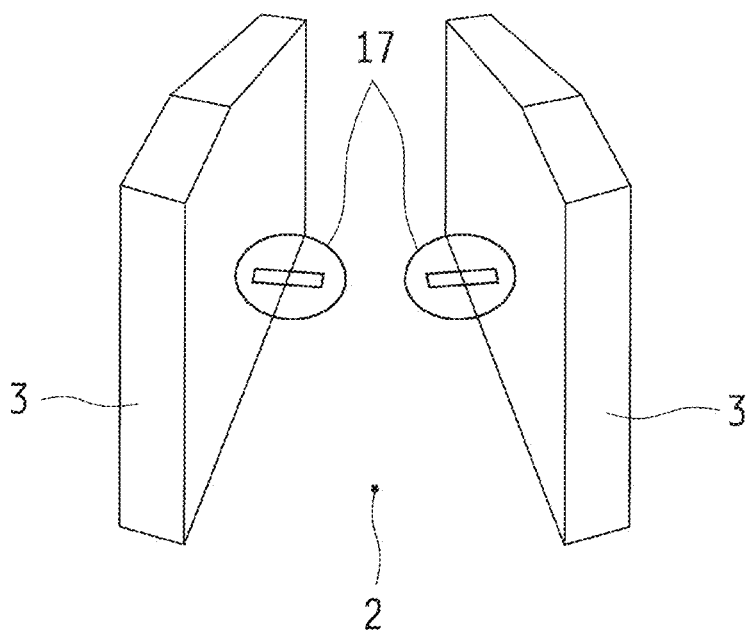
FIG. 18 is a diagram schematically illustrating a gate device provided to a display system according to one or more embodiments, and an example of an image presented thereby.

FIG. 17 and FIG. 18 schematically illustrate a gate device 3 provided to the display system according to one or more embodiments, and an example of an image 17 presented thereby; While in FIG. 15 and FIG. 16 a gate device 3 arranged on one side of the passage 2 presents the image 17, as illustrated in FIG. 17 and FIG. 18 the gate device 3 is arranged on both sides of the passage 2 and is configured to present the image 17 has a stereoscopic image at both sides. FIG. 17 depicts an image 17 indicating that traffic is permitted through the passage 2, while FIG. 18 depicts an image 17 indicating that traffic is not permitted through the passage 2.

Forms of Arranging the Display Device 1 in the Passage 2

Figure 19:
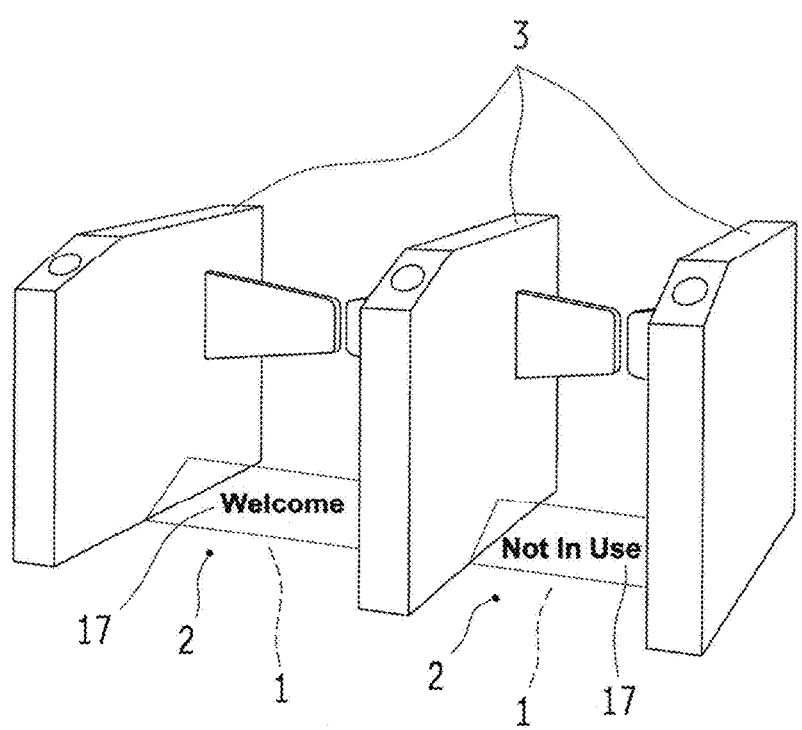
FIG. 19 is a perspective view schematically illustrating the external features of an example of adopting a display system according to one or more embodiments.

FIG. 19 is perspective view schematically illustrating the external features of an example of adopting the display system according to one or more embodiments. FIG. 19 depicts the light guide plate 11 in the display device 1 arranged in the floor portion of the passage 2 in the gate system. The display device 1 is arranged in the floor portion of the passage 2, whereby the image 17 can be presented as a stereoscopic image that appears to float above the passage 2. The image 17 presented is a stereoscopic image indicating whether or not entry into the passage 2 is permitted, and the image 17 can be seen from a position prior to entering the passage 2. In the example depicted in FIG. 19, the image 17 on the left side is shown as the characters "WELCOME" indicating entry into the passage 2 is permitted. On the right side the image 17 is shown as the characters "NOT IN USE" indicating entry into the passage 2 is not permitted. In FIG. 19, the image 17 is presented enclosed in a thin square frame to provide a convenient illustration. The image 17 may in fact be shown as floating inside a square frame over a space including a rectangle represented by the square frame.

Figure 20:
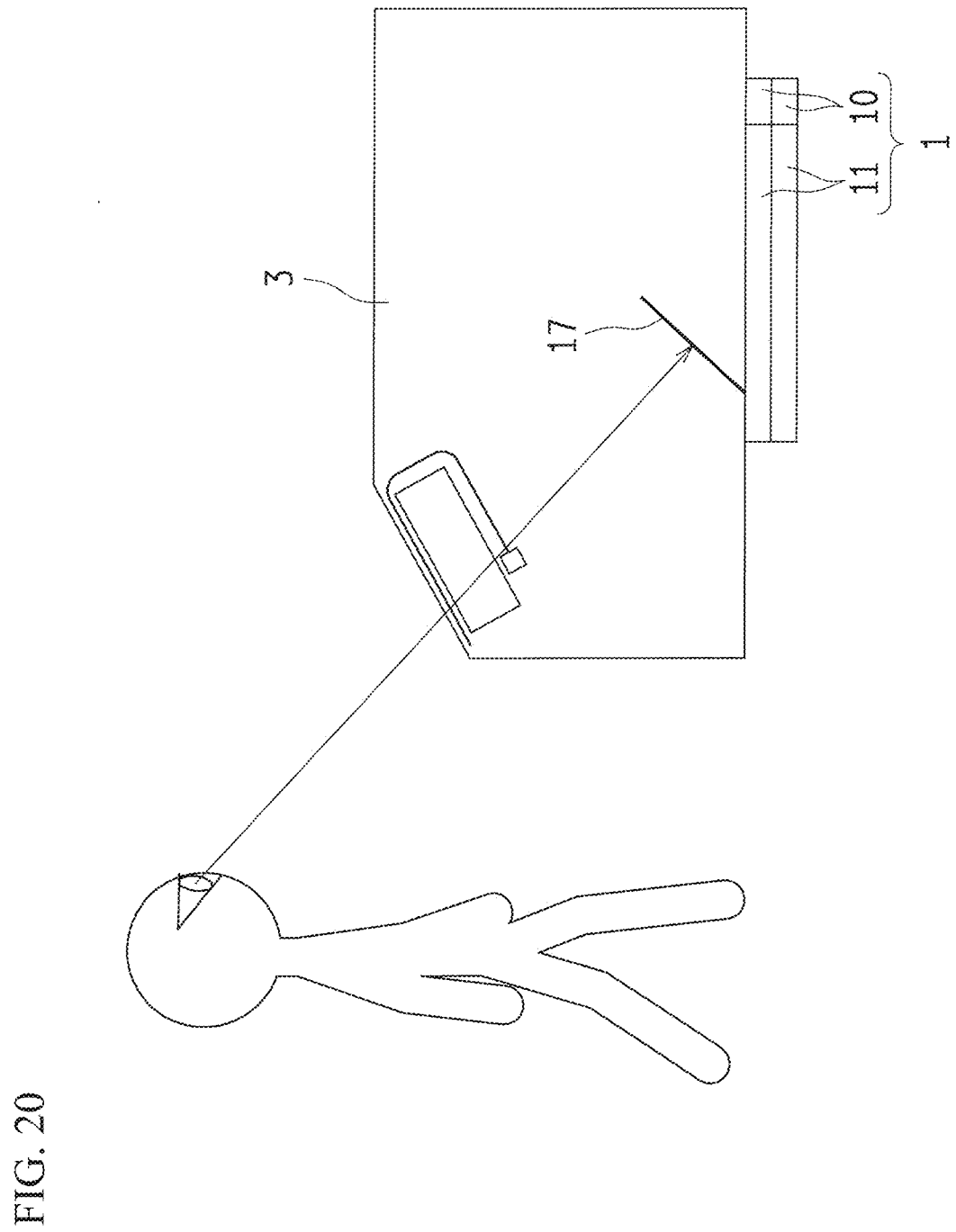
FIG. 20 is a schematic view illustrating a display system according to one or more embodiments.

FIG. 20 is a schematic view of the display system according to one or more embodiments; FIG. 20 depicts the display device 1 arranged in the floor portion of the passage 2 of a gate device 3 in the gate system. The display device 1 arranged at the floor portion of the passage 2 is provided with two groups of light sources 10 and light guide plates 11. The two groups of light guide plates 11 overlap parallel to the floor surface. Light from the light sources 10 arranged at the further end of the passage 2 enters the light guide plates 11. The light guide plates 11 change the path of incident light entering therein and cause the emission surface 13, which is oriented upward to emit light. Hereby the light guide plates 11 present an image 17 as a stereoscopic image above the passage 2. One of the two light sources 10 selectively emits light; hereby the image 17 corresponding to that light source 10 is selectively shown.

Figure 21:
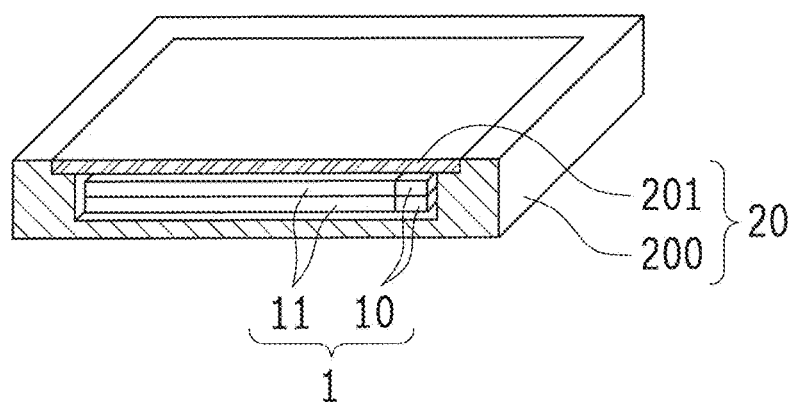
FIG. 21 is a perspective view schematically illustrating a cut away of a display device in a display system according to one or more embodiments.

FIG. 21 is a perspective view schematically illustrating a cut away of the display device 1 in the display system according to one or more embodiments. The display device 1 illustrated in FIG. 21 is arranged at the floor portion of the passage 2. More specifically, FIG. 21 depicts a perspective view of a cut away of the display device 1 and the surrounding material to aid understanding the cross section of the display device 1 thusly arranged. The display device 1 is embedded in the floor portion of the passage 2 and serves as a passage unit 20. The passage unit 20 is a rectangle in planar view where the length direction runs parallel to the passage 2. The passage unit 20 is provided with a passage and closure 200 where the upper surface is open. The display device 1 is housed inside the passage enclosure 200 so that the planar direction of the light guide plate 11 is substantially parallel to the floor surface. The open upper surface of the passage enclosure 200 includes a transparent protective passage plate 201 fitted thereto; the protective passage plate 201 is made up of hardened glass or the like. Light emitted from the display device 1 passes through the protective passage plate 201 and forms an image above the passage 2 to thereby present the image 17.

Figure 22:
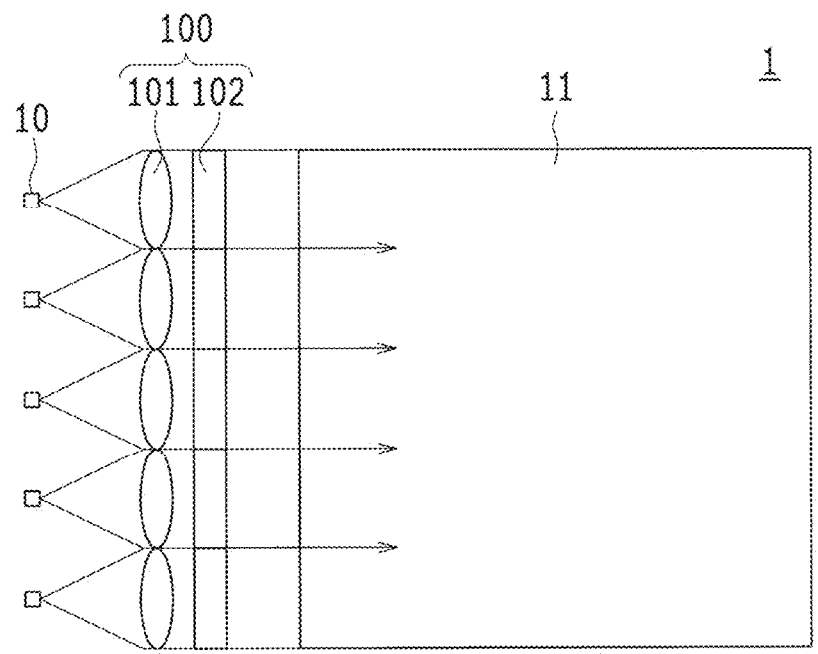
FIG. 22 is a plan view schematically illustrating a display device in a display system according to one or more embodiments.
Figure 23:
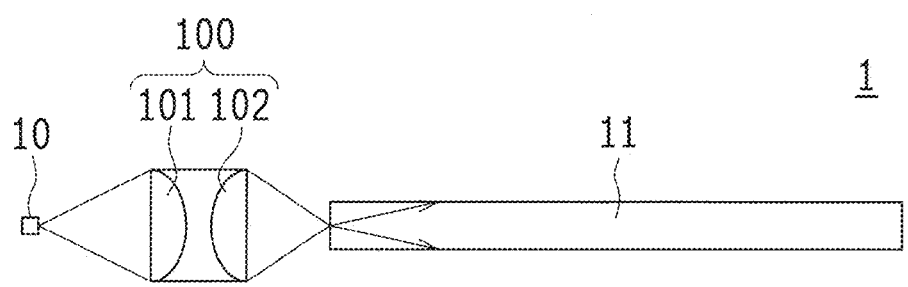
FIG. 23 is a side view schematically illustrating a display device in a display system according to one or more embodiments.

FIG. 22 is a plan view schematically illustrating a display device 1 in the display system according to one or more embodiments; and FIG. 23 is a side view schematically illustrating the display device 1 in the display system according to one or more embodiments. FIG. 22 and FIG. 23 depict other embodiments where the display device 1 is arranged in the floor portion of the passage 2. In the embodiments depicted in FIG. 22 and FIG. 23, the display device 1 is provided with a plurality of light sources 10 arranged along the incidence end surface 12 of the light guide plate 11. A refractive portion 100 is arranged between the light sources 10 and the light guide plate 11. The refractive portion 100 is made up of an aspherical lens 101 arranged toward the light source 10 and a cylindrical lens arranged toward the light guide plate 11. The aspherical lens 101 and the cylindrical lens 102 provided to the refractive portion 100 modify the optical path of light emitted radially from the light source 10. The light thus enters the light guide plate 11 traveling parallel to the length direction of the light guide plate 11. As long as the incident light entering the light guide plate 11 travels parallel to the length direction of the light guide plate 11 spreading of the incident light in the thickness direction is not particularly problematic.

Figure 24A:
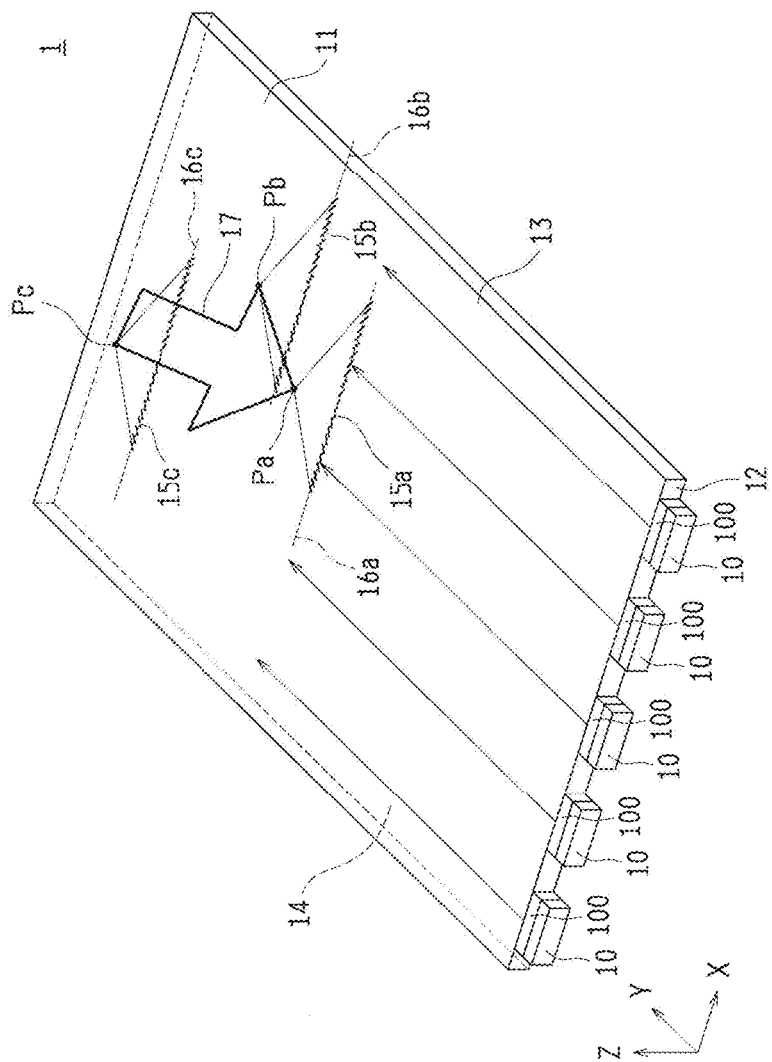
FIG. 24A is a diagram illustrating a display device in a display system according to one or more embodiments and schematically illustrating the display device along with an image formed in a space.
Figure 24B:
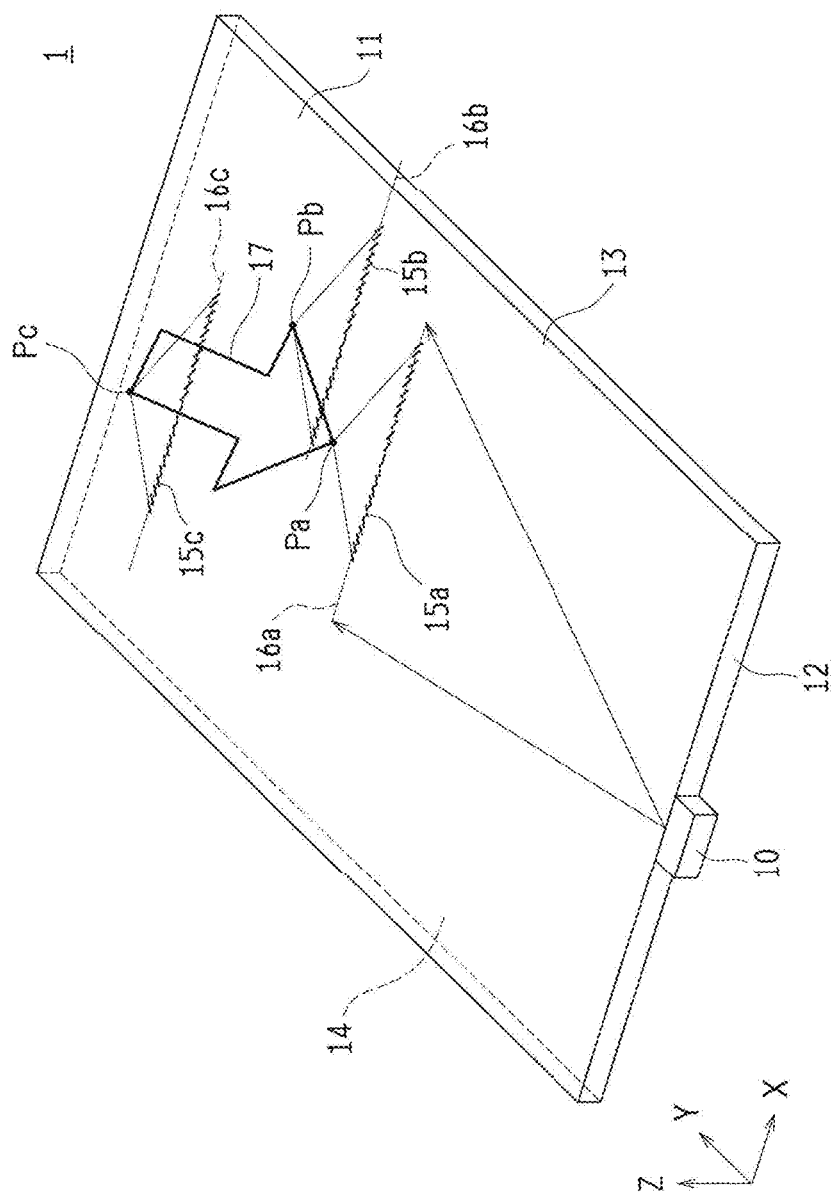
FIG. 24B is a diagram illustrating a display device in a display system according to one or more embodiments and schematically illustrating the display device along with an image formed in a space.

FIG. 24A and FIG. 24B are for describing a display device 1 in the display system according to one or more embodiments and schematically illustrates the display device 1 along with an image 17 formed in a space. FIG. 24A illustrates an embodiment where parallel light enters the light guide plate by employing the refractive portion 100; and FIG. 24B is provided for comparison where no refractive portion 100 is provided. The display device 1 depicted in FIG. 24A uses a plurality of light sources 10 to provide a bright image 17. In addition, compared to an optical path that spreads radially within the light guide plate 11, light progressing in an optical path that is straight and parallel reduces the variation in optical path caused by the light focusing portions 15. Thus, the display device 1 illustrated in FIG. 24A can form a bright image 17 at a location that is further away; therefore, it is possible to increase how much the image 17, which is presented as a stereoscopic image, appears to protrude from the surface. Accordingly, a display device 1 that uses the refractive portion 100 to cause light from a plurality of light sources 10 to enter the light guide plate 11 as parallel light is suited for arrangement in the floor portion of the passage 2 since it is possible for this display device 1 to show a bright image 17 even for a larger image.

Figure 25:
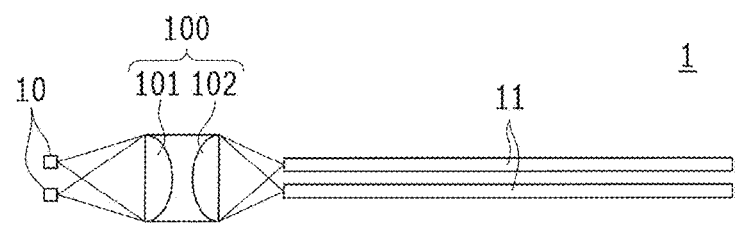
FIG. 25 is a side view schematically illustrating a display device in a display system according to one or more embodiments.
Figure 26:
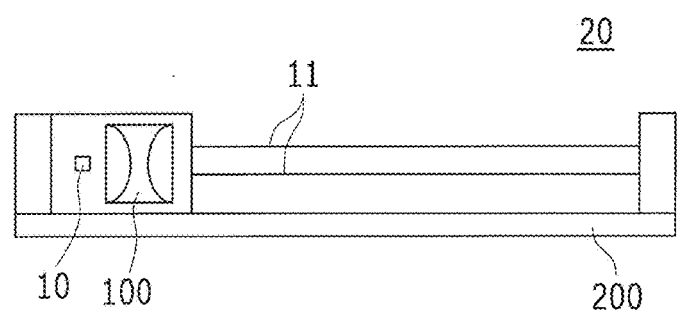
FIG. 26 is a side view schematically illustrating a passage unit combined with a display device in a display system according to one or more embodiments.

FIG. 25 is a side view schematically illustrating a display device 1 in the display system according to one or more embodiments; and FIG. 26 is a side view schematically illustrating a passage unit 20 combined with the display device 1 in the display system according to one or more embodiments. The display device 1 may be provided with a plurality of groups of light sources 10 and refractive portions 100. A plurality of light guide plates 11 must be provided to allow a plurality of types of images 17 to be shown in order for such a display device 1 to serve as a passage unit 20. FIG. 25 is a schematic view of a display device 1 provided with a plurality of groups of light sources 10 and refractive portions 100, as well as two light guide plates 11. FIG. 26 illustrates the display device 1 of FIG. 25 embedded in the floor portion of a passage 2 to serve as a passage unit 20. Note that a portion of the light sources 10, the refractive portions 100, and the protective passage plate 201 provided to the passage unit 20 is omitted in FIG. 26 to facilitate understanding.

Each light guide 11 must have a corresponding light source 10 when there is a plurality of light guide plates 11, in order for each image 17 to be shown independently. However, the refractive portion 100 may be shared. The plurality of light sources 10 in the display device 1 illustrated in FIG. 25 is arranged vertically with the refractive portion 100 refracting the light from each light source 10 so that the light enters the light guide plate 11 stacked vertically. Light emitted from the light source 10 arranged at the upper part enters the light guide plate 11 arranged at the lower part, and light emitted from the light source 10 arranged at the lower part enters the light guide plate 11 arranged on the upper part. As illustrated in FIG. 26, the display device 1 depicted in FIG. 25 is integrated with a passage unit 20.

Figure 27:
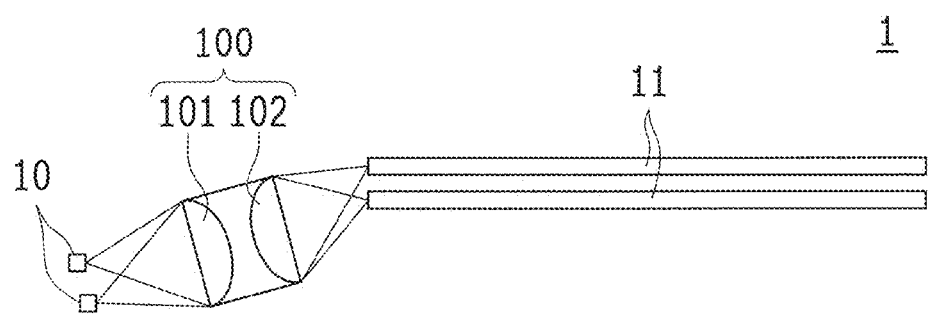
FIG. 27 is a side view schematically illustrating a display device in a display system according to one or more embodiments.
Figure 28:
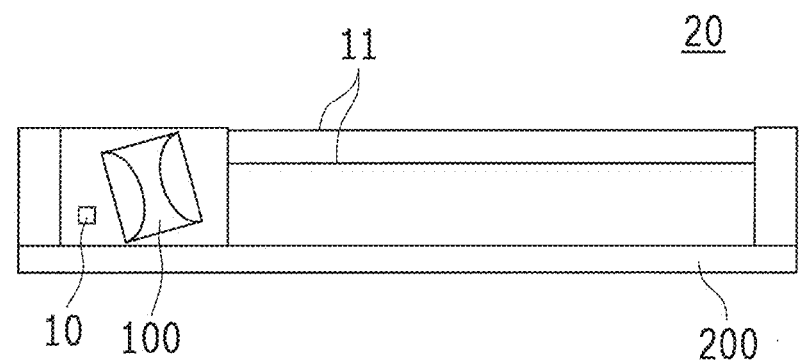
FIG. 28 is a side view schematically illustrating a passage unit combined with a display device in a display system according to one or more embodiments.

FIG. 27 is a side view schematically illustrating a display device 1 in the display system according to one or more embodiments; and FIG. 28 is a side view schematically illustrating a passage unit 20 combined with the display device 1 in the display system according to one or more embodiments. The display device 1 depicted in FIG. 27 and the passage unit 20 depicted in FIG. 28 provides examples of modifying the display device 1 depicted in FIG. 25 and the passage unit 20 depicted in FIG. 26. The display device 1 depicted in FIG. 27 is modified such that the optical axes of the aspherical lens 101 and the cylindrical lens 102 provided in the refractive portion 100 are inclined; the light source 10 is arranged slightly below the display device 1 and the light passing through the refractive portion 100 which has an inclined optical axis enters a light guide plate 11 that is arranged slightly thereabove. When the display device 1 arranged as illustrated in FIG. 27 is integrated with a passage unit 20, the emission surface 13 of the light guide plates 11 are arranged near the upper surface of the passage unit 20 (i.e., the protective passage plate 201 which is not shown) as illustrated in FIG. 28. Arranging the emission surface 13 of the light guide plate 11 near the upper surface of the passage unit 20 provides a sense of unity and a sense of continuity along the floor surface of the passage 2.

Figure 29:
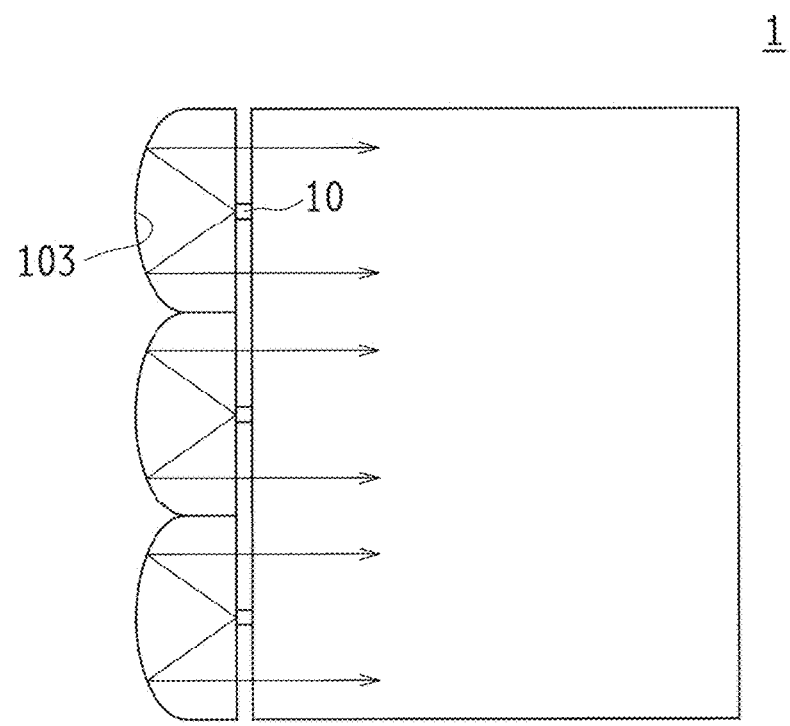
FIG. 29 is a plan view schematically illustrating a display device in a display system according to one or more embodiments.
Figure 30:
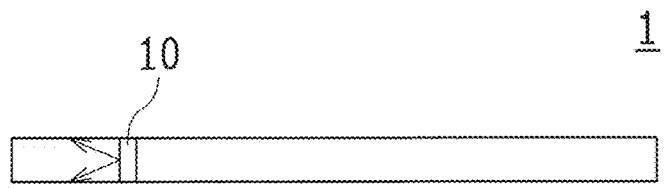
FIG. 30 is a side view schematically illustrating a display device in a display system according to one or more embodiments.

FIG. 29 is a plan view schematically illustrating a display device 1 in the display system according to one or more embodiments; and FIG. 30 is a side view schematically illustrating the display device 1 in the display system according to one or more embodiments. FIG. 29 and FIG. 30 depict other embodiments where the display device 1 is arranged in the floor portion of the passage 2. In the embodiments depicted in FIG. 29 and FIG. 30, the display device 1 is provided with a plurality of light sources 10 arranged along the incidence end surface 12 of the light guide plate 11. A reflective portion 103 having a parabolic mirror is arranged between the light sources 10 and the light guide plate 11. The light sources radiate light toward the reflective portion 103. The parabolic mirror provided to the reflective portion 103 modifies the optical path of light emitted radially from the light source 10. The light thus enters the light guide plate 11 traveling parallel to the length direction of the light guide plate 11. The display device 1 thusly configured with a plurality of groups of light sources 10 and reflective portions 103 is suited for arrangement in the floor portion of the passage 2, similarly to the display device using a refractive portion 100, since it is also possible for this display device 1 to show a bright image 17 even for a larger image. Note that adopting a display device provided with a reflective portion 103 as a passage unit 20 is identical to using a refractive portion 100; therefore, the description thereof is omitted.

Figure 31:
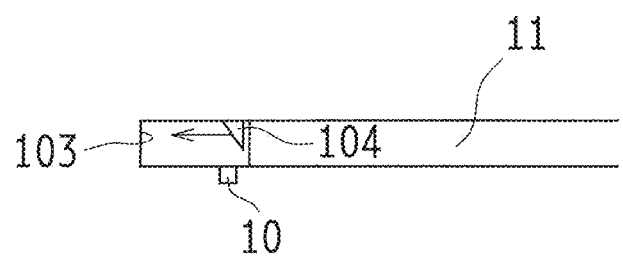
FIG. 31 is a side view schematically illustrating a display device in a display system according to one or more embodiments.
Figure 32:
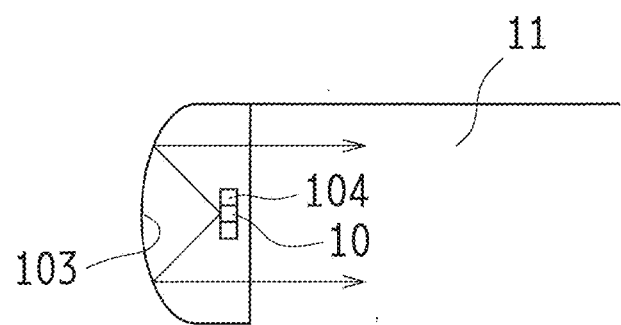
FIG. 32 is a plan view schematically illustrating a display device in a display system according to one or more embodiments.

FIG. 31 is a side view schematically illustrating a display device 1 in the display system according to one or more embodiments; and FIG. 32 is a plan view schematically illustrating the display device 1 in the display system according to one or more embodiments. The display device 1 illustrated in FIG. 31 and FIG. 32 are examples of modifying the plurality of groups of light sources 10 and reflected portions 103 provided to the display device 1 is illustrated in FIG. 29 and FIG. 30. Here, the light sources 10 are arranged below the reflective portions 103, and a reflective plate 104 such as a prism is provided. The reflective plate 104 changes the optical path of light radiating from the light source 10 arranged below toward the parabolic mirror. In a display device 1 thusly configured, light emitted from a light source arranged at a lower part is reflected toward the parabolic mirror by the reflective plate 104 and further reflected by the parabolic mirror to enter the light guide plate 11 as parallel light.

Figure 33:
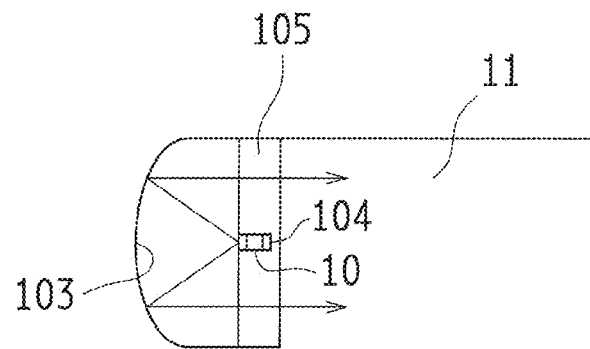
FIG. 33 is a plan view schematically illustrating a display device in a display system according to one or more embodiments.
Figure 34:
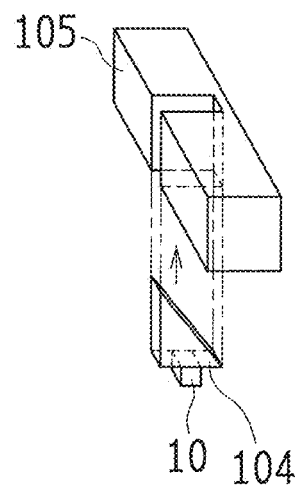
FIG. 34 is an exploded perspective view schematically illustrating a display device in a display system according to one or more embodiments.

FIG. 33 is a plan view schematically illustrating a display device 1 in the display system according to one or more embodiments; and FIG. 34 is an exploded perspective view schematically illustrating the display device 1 in the display system according to one or more embodiments. The display device 1 illustrated in FIG. 33 and FIG. 33 are further examples of modifying the plurality of groups of light sources 10, reflective portions 103, and reflective plate 104 provided to the display device 1 is illustrated in FIG. 31 and FIG. 32. The display device 1 illustrated in FIG. 33 and FIG. 34 is configured with a joint 105 that is a similar material as the reflective portion 103. The joint 105 is provided at the reflective portion 103 near the light guide plate 11. The joint 105 includes a notch, and the reflective plate 104 that is attached to the light source 10 is inserted and fitted thereto. The joint 105 may be fixed to the light guide plate 11 without any gaps, to thereby control any loss of incident light entering the light guide plate 11.

Gate Devices 3 with Transparent Wall Surfaces

Figure 35:
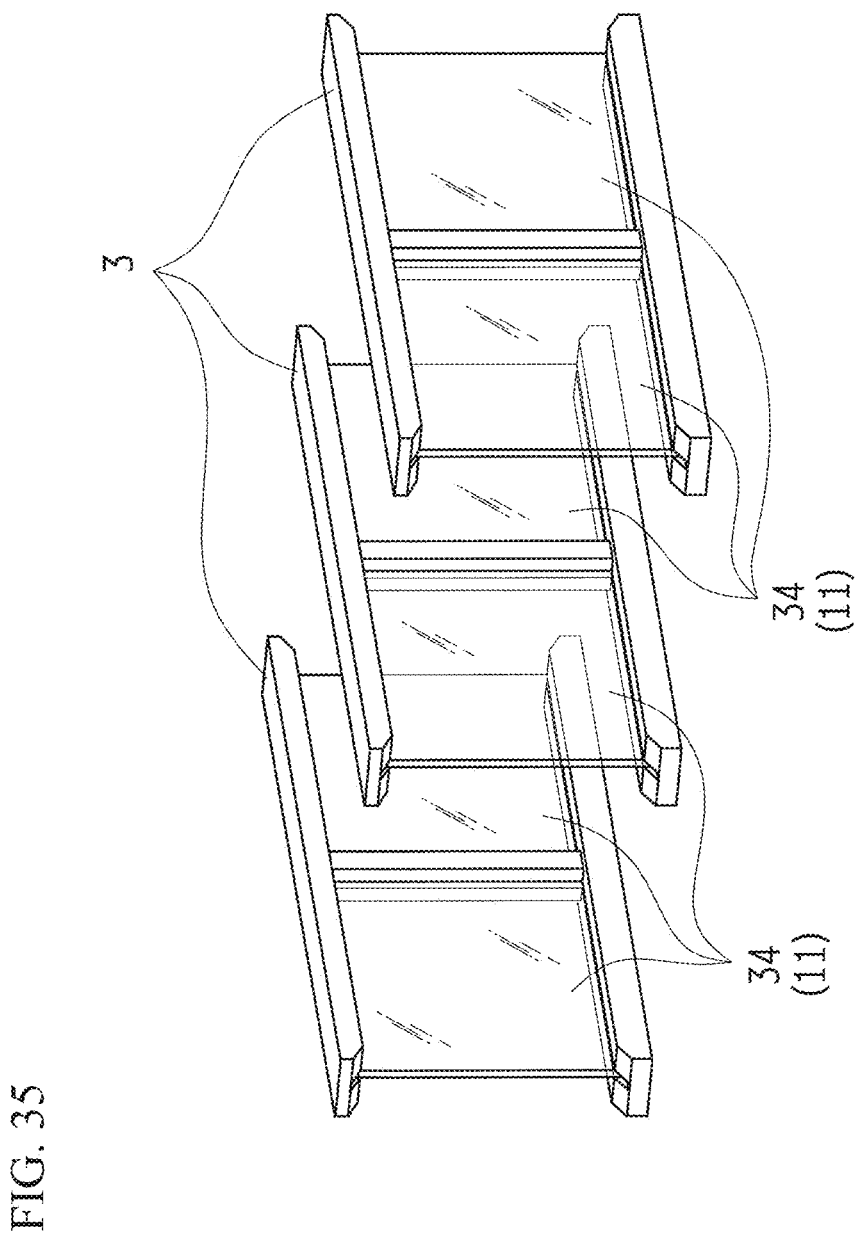
FIG. 35 is a perspective view schematically illustrating an example of adopting a display system according to one or more embodiments.
Figure 36:
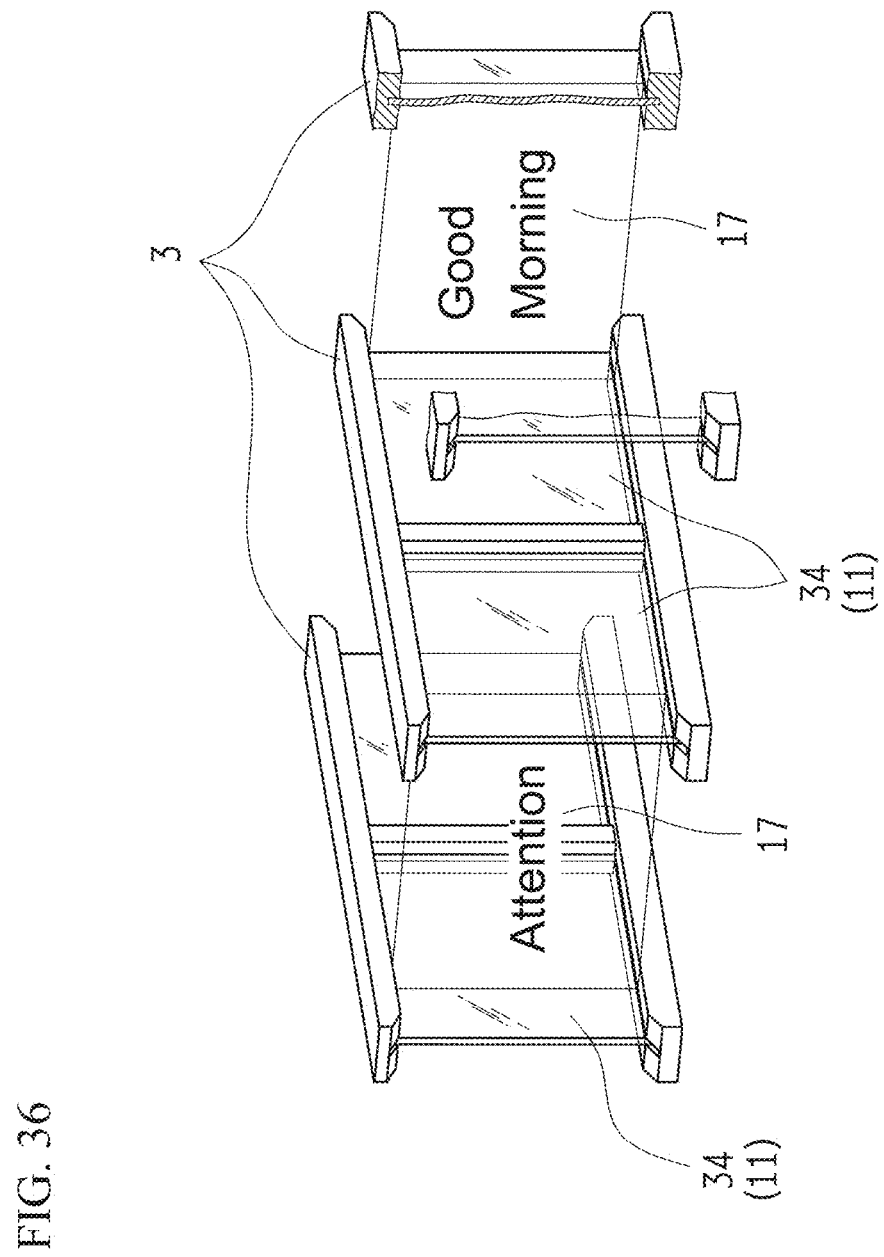
FIG. 36 is a perspective view schematically illustrating an example of adopting a display system according to one or more embodiments.

FIG. 35 and FIG. 36 are perspective views schematically illustrating an example of adopting the display system according to one or more embodiments. FIG. 35 depicts when no image 17 is shown, and FIG. 36 depicts when an image 17 is shown. FIG. 36 is a partial cut cross-section of the gate device 3 so that the image 17 shown can be seen easily. In FIG. 36, the image 17 is presented enclosed in a thin square frame to provide a convenient illustration. The image 17 may in fact be shown as floating inside a square frame over a space including a rectangle represented by the square frame. There is an increasing focus on the design characteristics of gate systems where the security gate or the like is arranged at the entry to an office building or event site. The gate device 3 adopted in the gate system illustrated in FIG. 35 on FIG. 36 is a translucent or semitransparent wall unit 34, which thereby improves the design. The wall unit 34 is parallel to the traffic direction of the passage 2 and stands vertically relative to the floor surface. Note that while the expressions "parallel" and "vertical" are used here, the wall unit does not necessarily need to be parallel or vertical in terms of design, and may be close to parallel and close to vertical or substantially parallel and substantially vertical. The gate device 3 illustrated in FIG. 35 on FIG. 36 is implemented by arranging the light guide plate 11 of the display device 1 in the side surface of the gay device 3 similarly to described with reference to FIG. 15 through FIG. 18 the gate device 3. The transparent wall unit 34 may be formed from transparent resin having a high refractive index such as a polycarbonate (PC) resin or poly methyl methacrylate (PMMA) resin, or using an inorganic material such as glass. The light guide plate 11 may be formed using a hardened or resin material and arranged to overlap with the wall unit 34 which is formed from a transparent material. However, light focusing portions 15 may be formed on the wall unit 34 with the wall unit 34 itself used as the light guide plate 11.

Gate Devices 3 with Transparent Door Units 31

Figure 37:
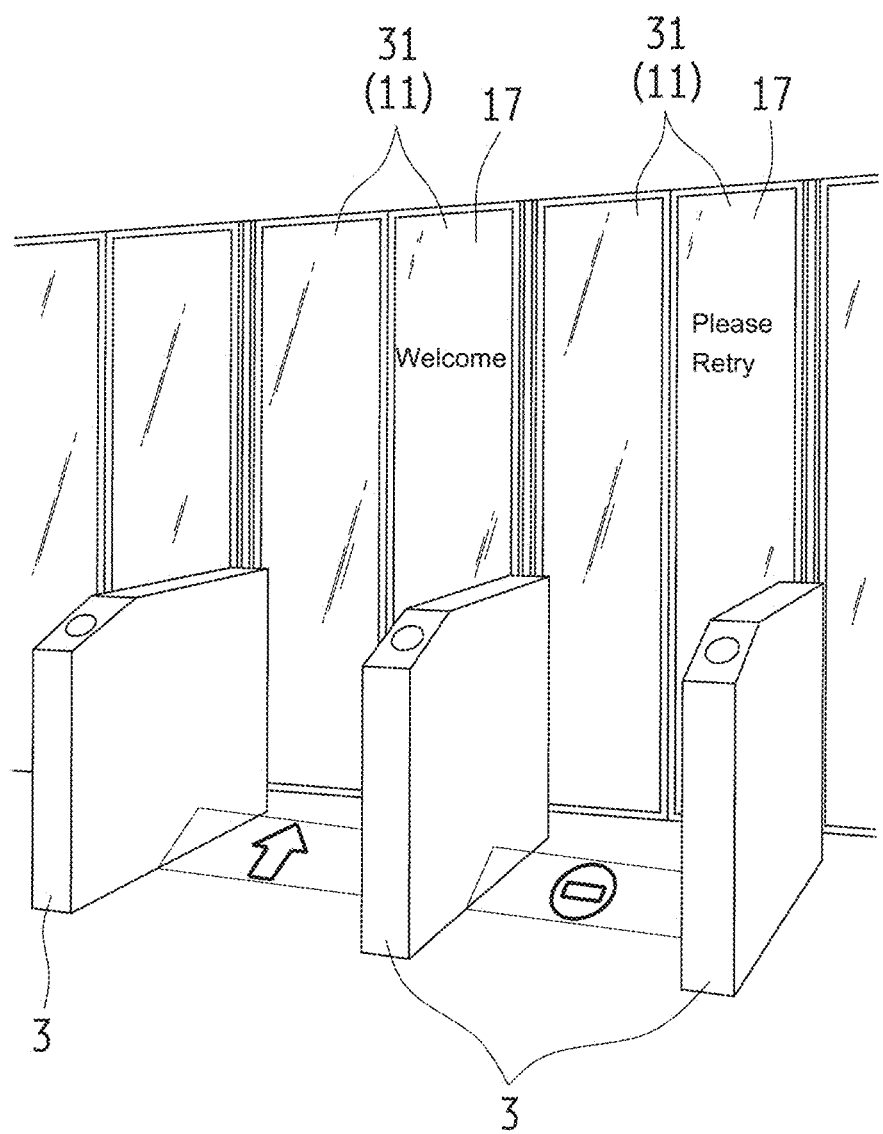
FIG. 37 is a perspective view schematically illustrating an example of adopting a display system according to one or more embodiments.

FIG. 37 is perspective view schematically illustrating an example of adopting the display system according to one or more embodiments. The gate device 3 adopted in the gate system illustrated in FIG. 37 is a translucent or semitransparent door unit 31 which thereby improves the design. The gate device 3 illustrated in FIG. 37 is implemented by arranging the light guide plate 11 of the display device 1 in the door unit 31. The transparent door unit 31 may be formed using a transparent resin material or inorganic material. The light guide plate 11 may be formed using a hardened or resin material and arranged to overlap with the door unit 31 which is formed from a transparent material. However, light focusing portions 15 may be formed on the door unit 31 with the door unit 31 itself used as the light guide plate 11.

Poll Gates

Figure 38:
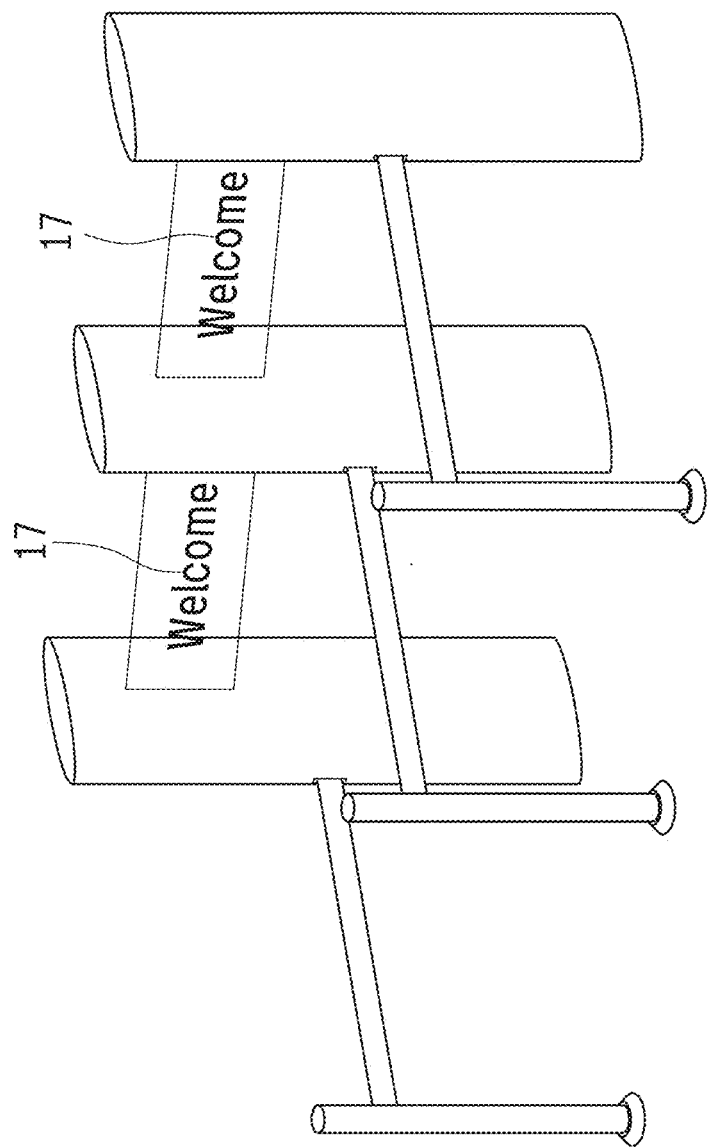
FIG. 38 is a perspective view schematically illustrating an example of adopting a display system according to one or more embodiments.

FIG. 38 is perspective view schematically illustrating an example of adopting the display system according to one or more embodiments; FIG. 38 illustrates the gate system adopted in a poll gate, which has excellent design characteristics. The display device 1 in the display system according to one or more embodiments may be arranged in the poll of a poll gate. The display device 1 thusly arranged may provide effects such as showing the image 17 as a stereoscopic image of the characters "WELCOME" in a space between two polls. In FIG. 38, the image 17 is presented enclosed in a thin square frame to provide a convenient illustration. The image 17 may in fact be shown as floating inside a square frame over a space including a rectangle represented by the square frame.

Movement System

An example of adopting a display system equipped with the above described display device 1 as a movement system is described. The movement system may be an escalator containing a lift-type or horizontal type escalator unit (moving unit) that includes an endless crawler driven tread, inner panels arranged on both sides in the movement direction of the tread, and endless crawler driven automatic handrails configured to travel around the inner panels. The movement system may be an elevator system including a lift. Note that "lift" also includes the lift-type escalator.

Escalator Systems

Figure 39:
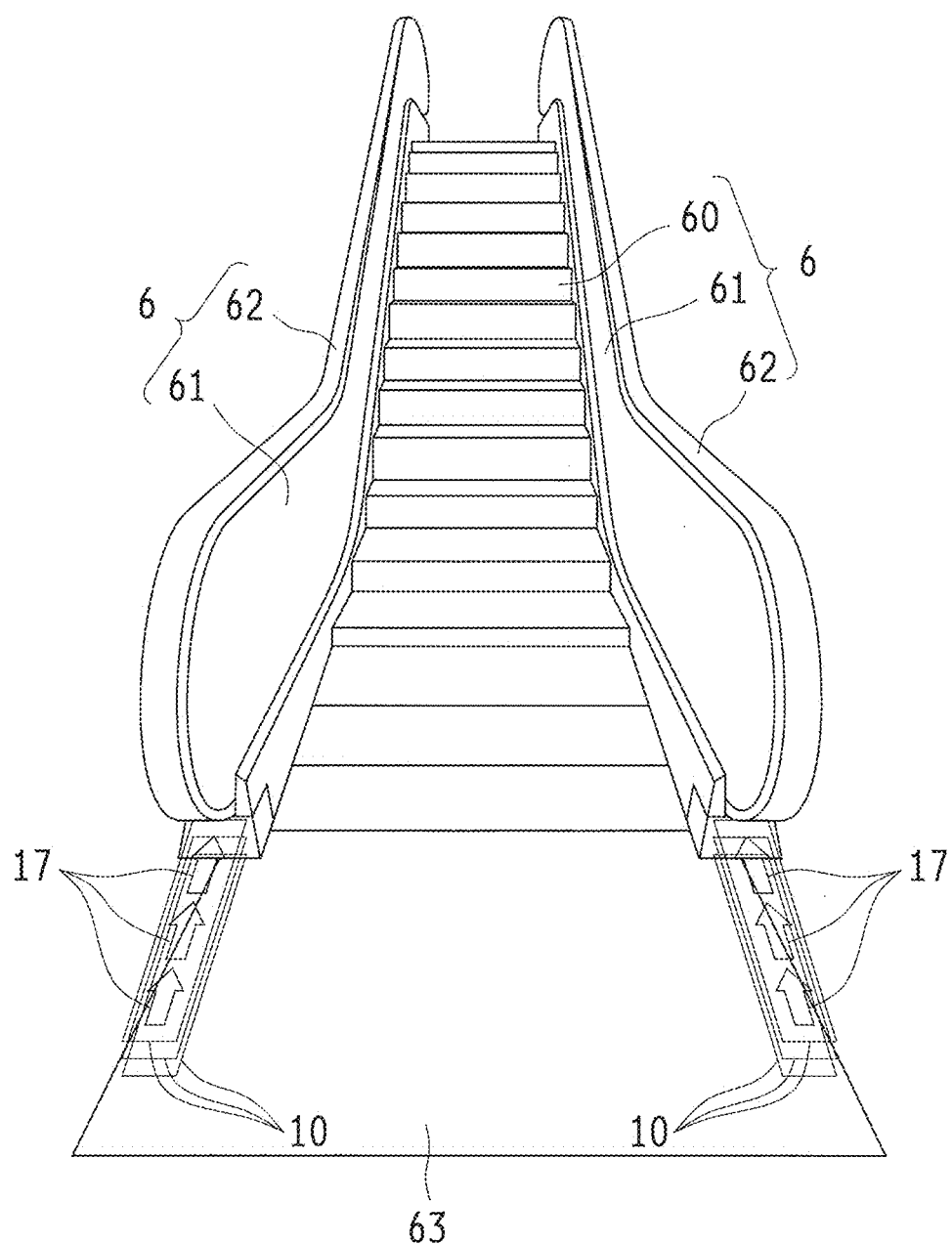
FIG. 39 is a perspective view schematically illustrating an example of adopting a display system according to one or more embodiments.
Figure 40:
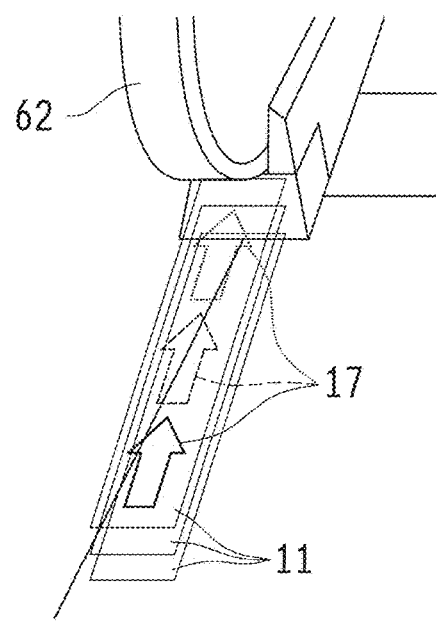
FIG. 40 is a perspective view schematically illustrating an example of adopting a display system according to one or more embodiments.

An example of adopting a display system equipped with the above described display device 1 in an escalator system including an escalator unit is described. FIG. 39 and FIG. 40 are perspective views schematically illustrating an example of adopting the display system according to one or more embodiments. FIG. 39 illustrates the movement system adopted as an escalator system. FIG. 39 depicts an ascending escalator along a frontward diagonal. FIG. 40 is a partial exploded view of the escalator system in FIG. 39. The escalator system includes various components such as an endless crawler driven tread 60; an inner panel 61 arranged on both sides along the moving direction of the tread 60; an endless crawler driven automatic handrail 62 traveling around the inner panels 61, and a cover plate 63 arranged in an area where the tread 60 enters. A traveler enters the escalator unit 6 which is an area designated for movement and made up of components such as the tread 60, the inner panel 61, the automatic handrail 62, and travels upstairs or downstairs. In the embodiment illustrated in FIG. 39 and FIG. 40, the light guide plate 11 of the display device 1 is arranged below and immediately in front of the portion of the automatic handrail 62 that protrudes; the light guide plate 11 presents the image 17 as a stereoscopic image to indicate that traffic is permitted on the escalator unit 6. The light guide plate 11 is schematically illustrated in FIG. 29 and FIG. 40. As illustrated in FIG. 39 and FIG. 40, three groups of light guide plates 11 are arranged overlapping below the protruding portion of the automatic handrail 62; each of the light guide plates 11 show a different image 17.

The images soon may be presented simultaneously; however, as schematically illustrated in FIG. 14, the three images 17 that show an arrow of the traffic direction may be shown in sequence. The image 17 may be presented in order showing an arrow. Hereby the image 17 shown allows an observer of the image 17 and particularly a traveler about to enter the escalator unit 6 to recognize the direction of traffic and makes the observer or traveler conscious that it is possible to enter the escalator unit 6.

Figure 41:
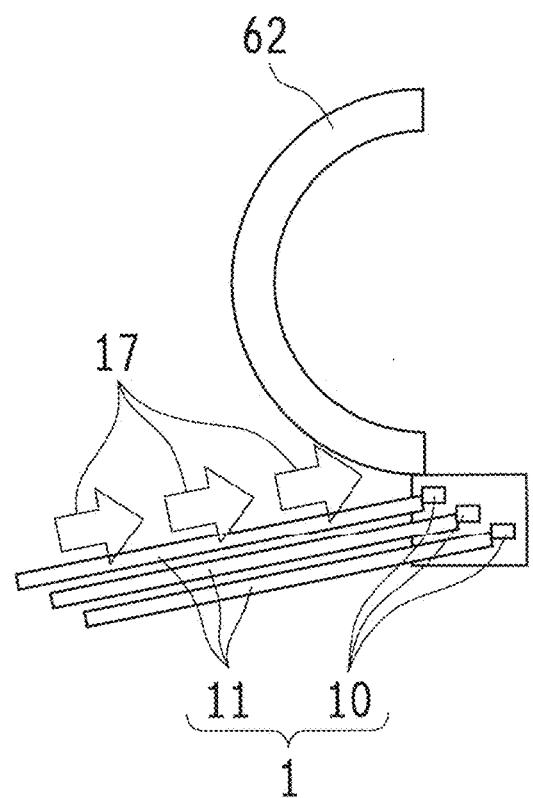
FIG. 41 is a diagram schematically illustrating a portion of the internal structure of an escalator system provided to a display system according to one or more embodiments, and an example of an image presented thereby.

FIG. 41 schematically illustrates a portion of the internal structure of an escalator system provided to the display system according to one or more embodiments, and an example of an image 17 presented thereby. FIG. 41 is a side view of the internal structure that presents the image 17 as a stereoscopic image near the automatic handrail 62 in the escalator system illustrated in FIG. 39 and FIG. 40. The display device 1 includes three groups of light sources 10 and light guide plates 11, with the light sources and light guide plates arranged below the automatic handrail 62. The light guide plates 11 overlap. Light from the three light sources 10 arranged below and toward the inner part of the automatic handrail 62 enter the light guide plates 11; the light guide plates 11 change the path of the incident light entering therein, and causes the light to exit therefrom to present the images 17 as stereoscopic images below and immediately in from of the automatic handrail 62. The uppermost light guide plate 11 and the second uppermost light guide plate 11 are transparent; and, by establishing the appropriate number and location of the light focusing portions 15, the overlapping light guide plates 11 may emit light without any obstructions. The light sources 10 emit light in sequence whereby the images 17 are presented in sequence; a traveler seeing the images 17 recognizes the direction of traffic on the escalator unit.

Figure 42:
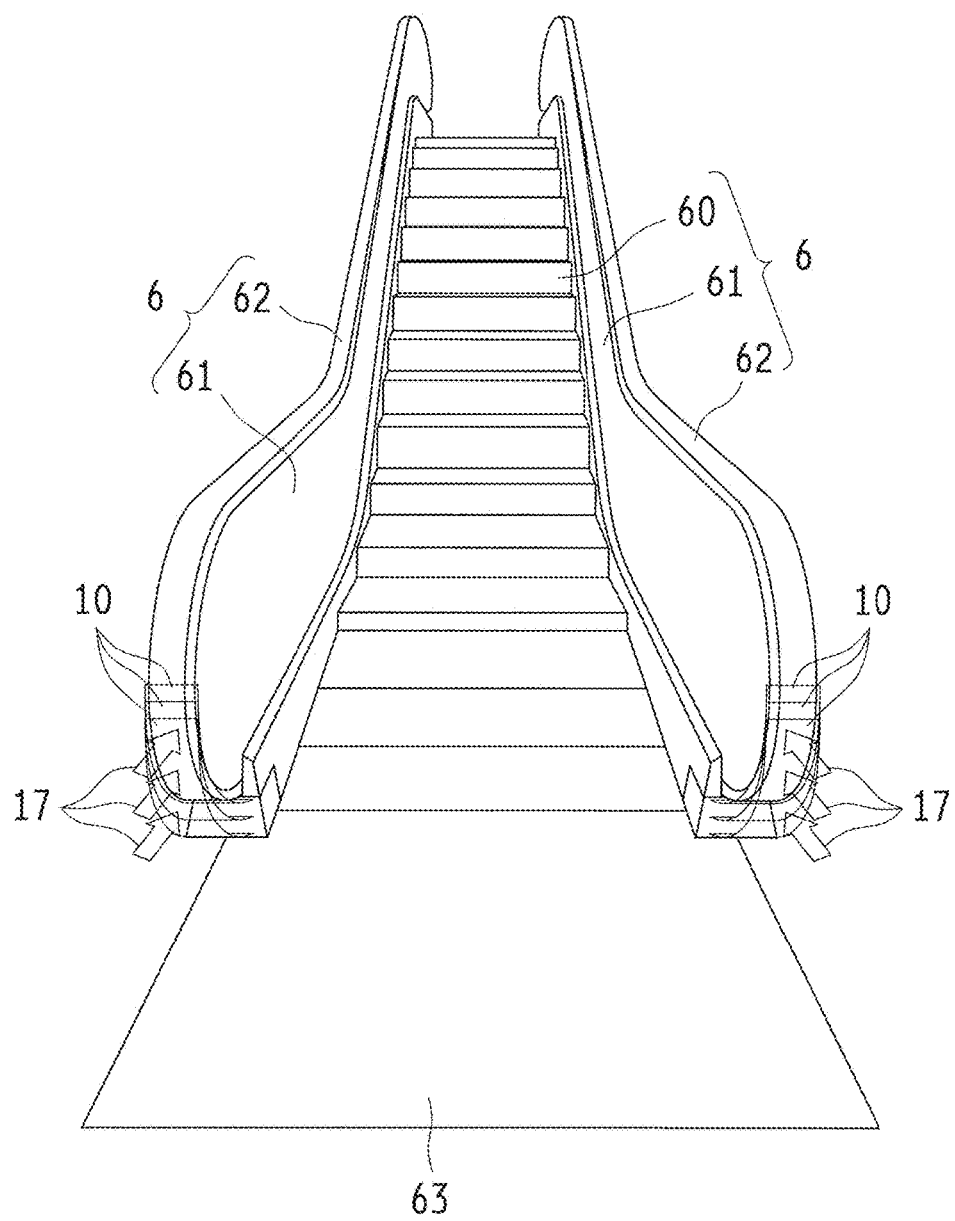
FIG. 42 is a perspective view schematically illustrating an example of adopting a display system according to one or more embodiments.

FIG. 42 is perspective view schematically illustrating an example of adopting the display system according to one or more embodiments. FIG. 42 illustrates another example configuration of the escalator system described with reference to FIG. 39 through FIG. 41. In this example configuration the three overlapping light guide plates 11 are curved along the moving direction of the automatic handrail 62. The display system illustrated in FIG. 42 presents an image 17 as a stereoscopic image indicating that traffic is permitted on the escalator unit 6; the image 17 is presented from the lower part to immediately in front of the automatic handrail 62 on the curved like iron plate 11. Because the image 17 is presented from an upper part and to immediately in front of the automatic handrail 62 compared to the display system illustrated in FIG. 39 through FIG. 41, the display system illustrated in FIG. 42 is more easy for a traveler to see as the traveler attempts to enter the escalator unit 6.

Figure 43:
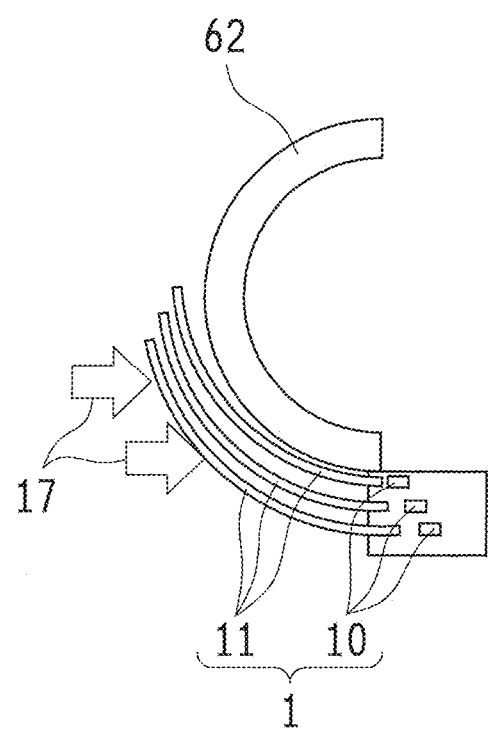
FIG. 43 is a diagram schematically illustrating a portion of the internal structure of an escalator system provided to a display system according to one or more embodiments, and an example of an image presented thereby.

FIG. 43 schematically illustrates a portion of the internal structure of an escalator system provided to the display system according to one or more embodiments, and an example of an image 17 presented thereby. FIG. 41 is a side view of the internal structure that presents the image 17 as a stereoscopic image near the automatic handrail 62 in the escalator system illustrated in FIG. 42. The display device 1 includes three groups of light sources 10 and light guide plates 11; the light sources and light guide plates are arranged from below to immediately in front of the automatic handrail 62. The light guide plates 11 overlap and are curved along the curved surface of the automatic handrail 62. Light from the three light sources 10 arranged below and toward the inner part of the automatic handrail 62 enter the light guide plates 11; the light guide plates 11 change the path of the incident light entering therein, and causes the light to exit therefrom to present the images 17 as stereoscopic images below and immediately in from of the automatic handrail 62. The uppermost light guide plate 11 and the second uppermost light guide plate 11 are transparent; and, by establishing the appropriate number and location of the light focusing portions 15, the overlapping light guide plates 11 may emit light without any obstructions. Even when the emission surface 13 of the light guide plate 11 is curved, the plurality of light focusing portions 15 change the path of incident light causing the light emitted to converge toward an external convergence point P1 or to radiate from an external convergence point P2 and thereby form an image externally and thereby present a stereoscopic image.

Figure 44:
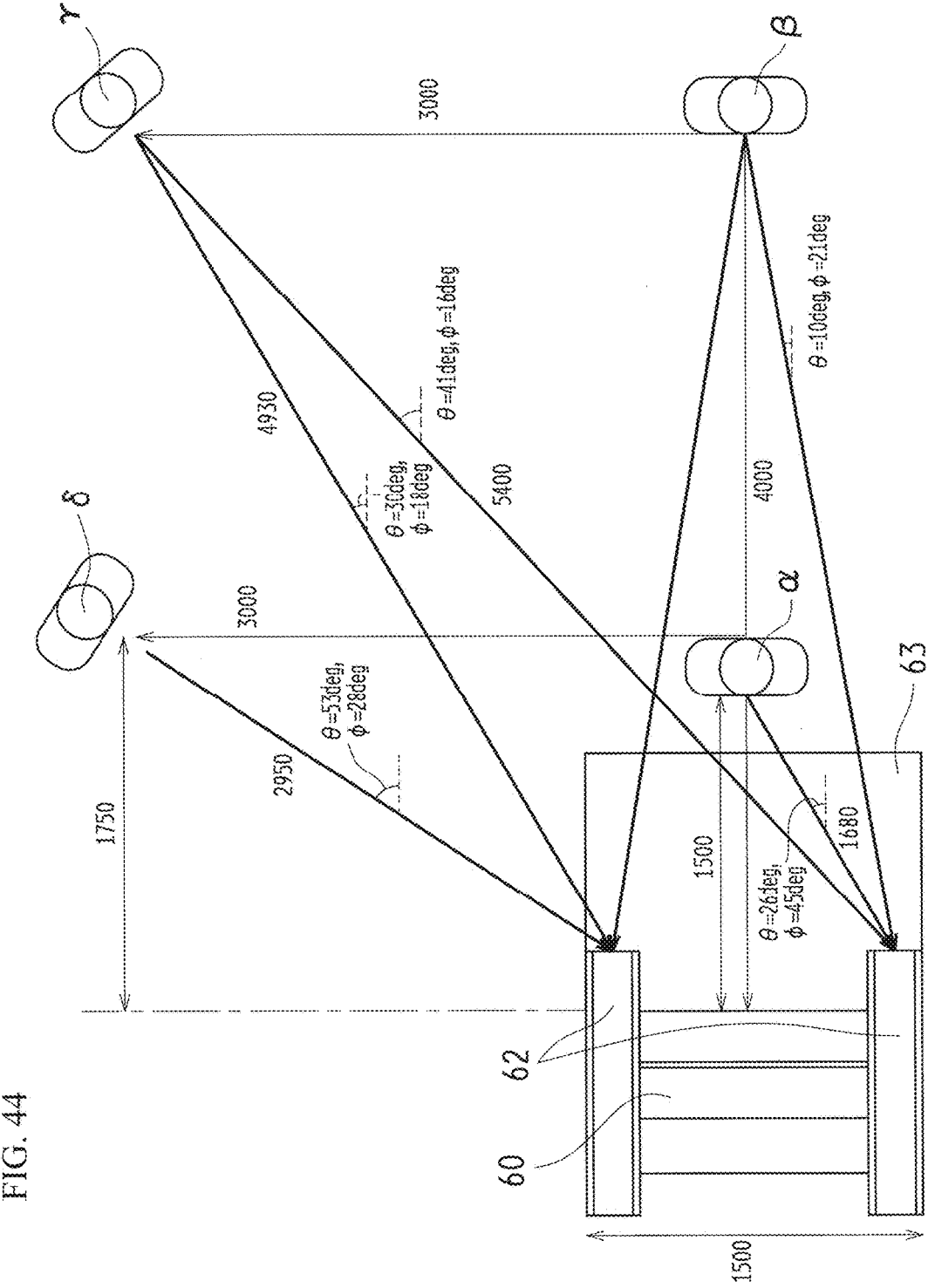
FIG. 44 is a block diagram schematically illustrating an example of an escalator system provided to a display system according to one or more embodiments and an example of the direction of a commuter's gaze.

Next, a configuration example of an escalator system is described; the escalator system presents an image 17 that is easily viewed travelers entering the escalator unit 6 from any direction. FIG. 44 is a block diagram schematically illustrating an example of an escalator system provided to the display system according to one or more embodiments and an example of the direction of a commuter's gaze. FIG. 44 schematically illustrates the angles of the gaze of travelers entering the escalator unit 6 while viewing the images 17 assumed to be presented below the left and right automatic handrails 62. The image 17 below the left and right automatic handrails 62 in the escalator unit 6 are modeled as being presented at substantially the height of the floor. To facilitate the description, the horizontal direction and the vertical direction in FIG. 44 are taken as the X-axis direction and the Y-axis direction, respectively. The center line of the escalator unit 6, which extends in X-axis direction is referred to simply as the center line; and the intersection of the center line and the tip end immediately in front of the tread 60 is taken as the origin. The automatic handrail 62 of the escalator unit 6 1600 mm wide; the height of the automatic handrail 62 from the floor to a traveler's gaze is 1600 mm. The gaze angle is expressed as the angle θ in the horizontal direction, with the X axis direction as 0 deg., and the angle φ with the vertical direction viewed from the traveler's eyes (i.e., the angle of depression).

A traveler at a position α which is a distance of 1500 mm from the origin along the X-axis direction sees the image 17 at θ=26 deg. and φ=45 deg. A traveler at a position β which is a distance of 4000 mm from the origin along the X-axis direction sees the image 17 at θ=10 deg. and φ=21 deg. A traveler at a position γ which is 4000 mm from the origin along the X-axis direction, and the distance of 3000 mm from the origin to the right of the center line in the Y-axis direction sees the image 17 on the left at θ=41 deg. and φ=16 deg., and sees the image 17 on the right at θ=30 deg. and φ=18 deg. A traveler at a position δ which is 1750 mm from the origin along the X-axis direction, and the distance of 3000 mm from the origin to the right of the center line in the Y-axis direction sees the image 17 at θ=53 deg. and φ=28 deg. Thus, the angle at which an image 17 shown below the automatic handrail 62 is seen varies largely in accordance with the location of the traveler.

Figure 45:
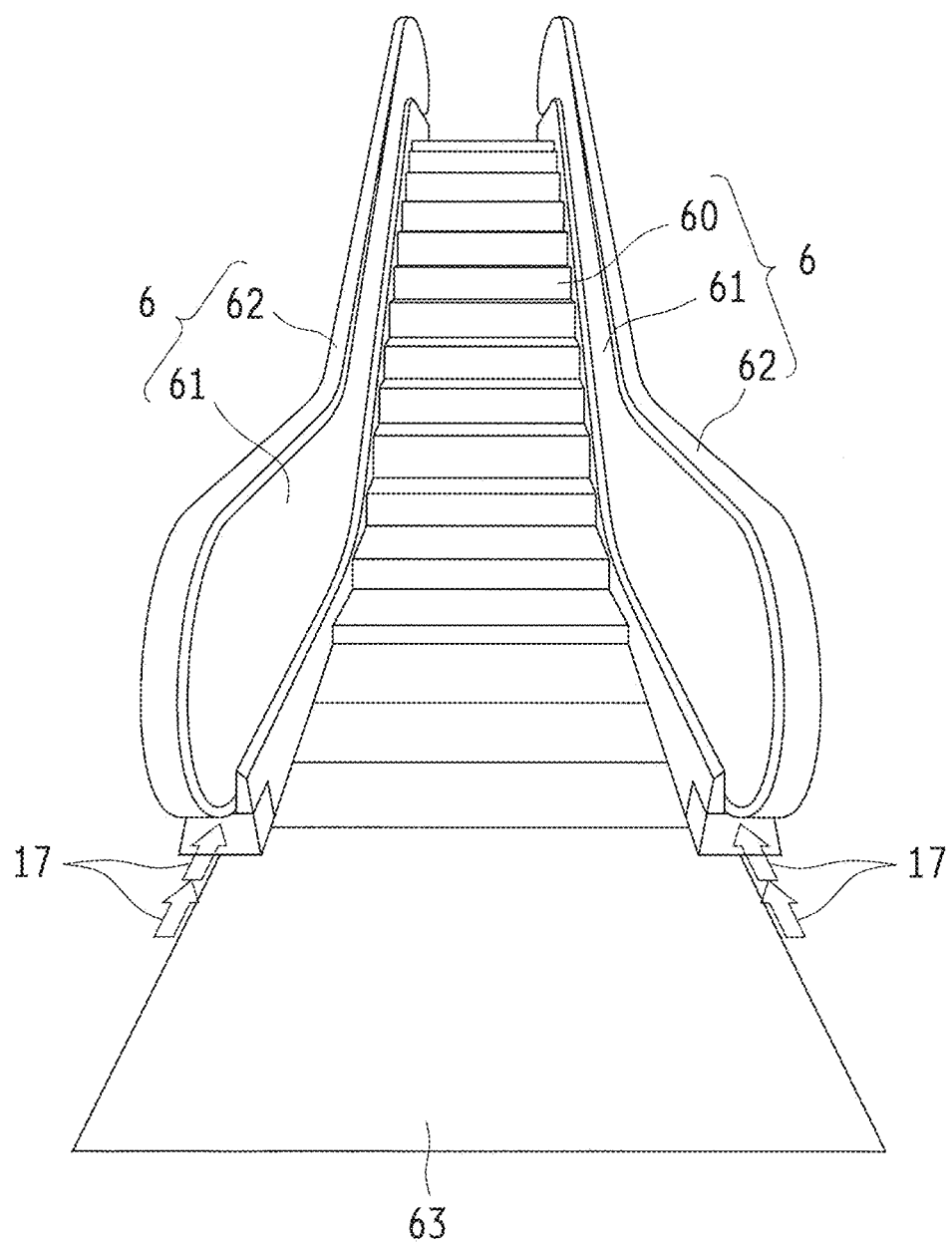
FIG. 45 is a perspective view schematically illustrating an example of adopting a display system according to one or more embodiments.
Figure 46:
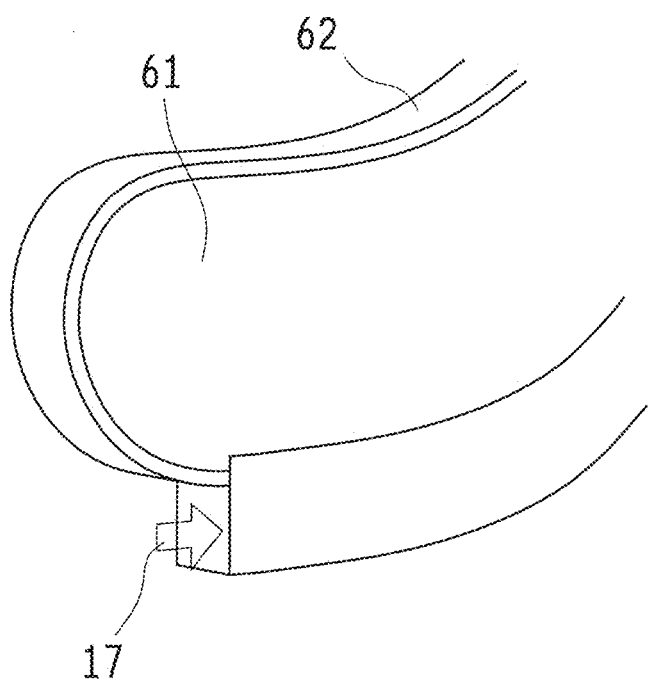
FIG. 46 is a perspective view schematically illustrating an example of adopting a display system according to one or more embodiments.

FIG. 45 and FIG. 46 are perspective views schematically illustrating an example of adopting the display system according to one or more embodiments. FIG. 45 and FIG. 46 illustrate examples of adopting the escalator system. FIG. 45 is a view from along the front were diagonal; and FIG. 46 illustrates near the lower part immediately in front of the automatic handrail 62 from the front right diagonal. As illustrated in FIG. 45 a traveler in front of the escalator system, for instance, the traveler at position α and the traveler at position β in FIG. 44 are able to easily see an image formed in a plane in the horizontal direction or an angle close to the horizontal direction. On the other hand, as illustrated in FIG. 46 a traveler next to or along the diagonal from the side toward the front in the escalator system, for instance, a traveler at position γ and the traveler at position δ in FIG. 44 are able to easily see an image 17 formed in a plane in the vertical direction or an angle close to the vertical direction.

Figure 47:
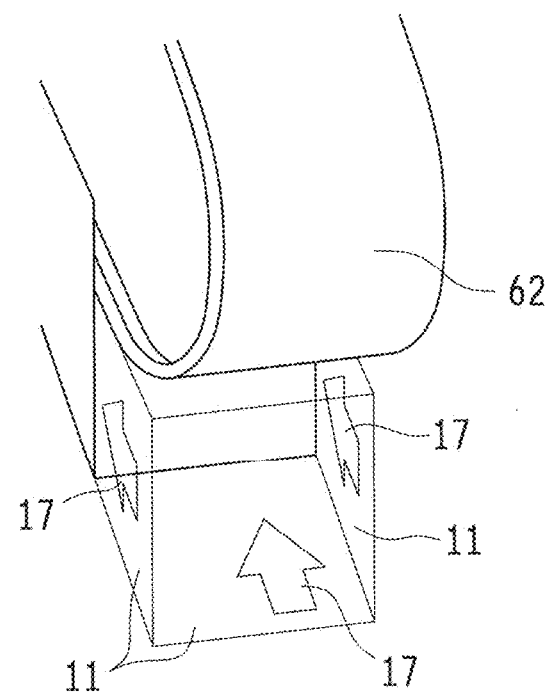
FIG. 47 is a perspective view schematically illustrating an example of adopting a display system according to one or more embodiments.

FIG. 47 is perspective view schematically illustrating an example of adopting the display system according to one or more embodiments; FIG. 47 illustrates an example of adopting the escalator system, and depicts the light guide plate 11 arranged below the automatic handrail 62, and the image 17 presented by the light guide plate 11. Light guide plates 11 stand along three directions below the automatic handrail 62, forming a front plane, a right plane, and a left plane. The light guide plate at the front plane presents an image 17 formed as a planar stereoscopic image in a substantially horizontal plane immediately in front of the automatic handrail; the light guide plates 11 at the right plane and the left plane each present an image 17 formed as a stereoscopic image in substantially vertical planes at the sides. As illustrated with reference to FIG. 45 and FIG. 46, a traveler can readily perceive an image 17 from the front when the image is presented almost horizontally; and a traveler can readily perceive an image 17 from the sides when the image is presented almost vertically. The display system (i.e., the escalator system) of the embodiment illustrated in FIG. 47 presents the image 17 so that the image 17 is easily visible from any position for a traveler about to enter the escalator system from various locations as illustrated in FIG. 44.

Figure 48:
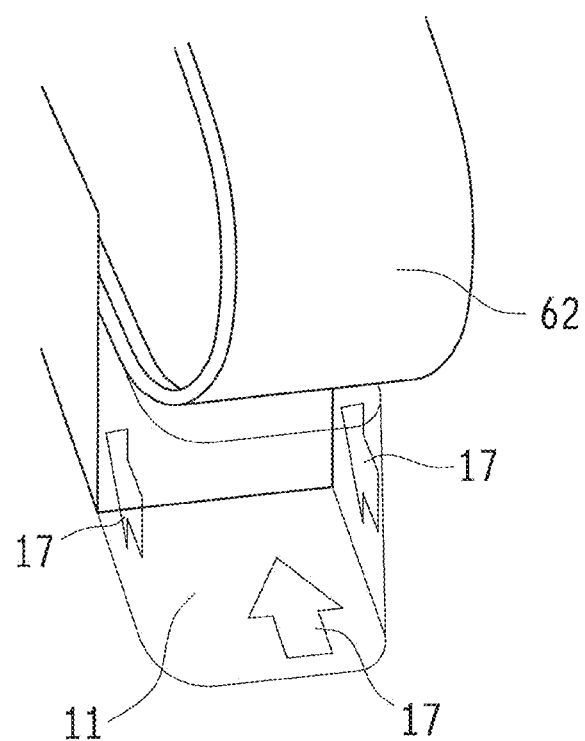
FIG. 48 is a perspective view schematically illustrating an example of adopting a display system according to one or more embodiments.

FIG. 48 is perspective view schematically illustrating an example of adopting the display system according to one or more embodiments. FIG. 48 illustrates an example of adopting the escalator system, and depicts the light guide plate 11 arranged below the automatic handrail 62, and the image 17 presented by the light guide plate 11. The escalator system illustrated FIG. 48 is another embodiment of the escalator system illustrated in FIG. 47. More specifically, a single light guide plate 11 stands underneath the automatic handrail 62 instead of three light guide plates 11. This single light guide plate 11 is curves at the corresponding corners. Light guide plate 11 illustrated in FIG. 48 includes a front surface where on the light focusing portions 15 are forms, and flat right and left surfaces. The portion of the light guide plate 11 corresponding to the front surface presents an image 17 formed as a planar stereoscopic image in a substantially horizontal plane immediately in front of the automatic handrail; the portions of the light guide plate 11 corresponding to the right and left surfaces each present an image 17 formed as a stereoscopic image in a substantially vertical plane at the sides of the automatic handrail. Accordingly, a traveler can readily perceive an image 17 from the front when the image is presented almost horizontally; and a traveler can readily perceive an image 17 from the sides when the image is presented almost vertically. That is, the display system (i.e., the escalator system) of the embodiment illustrated in FIG. 48 presents the image 17 so that a traveler about to enter the escalator system from various locations can readily perceive the image 17 from any position as illustrated in FIG. 44.

Figure 49:
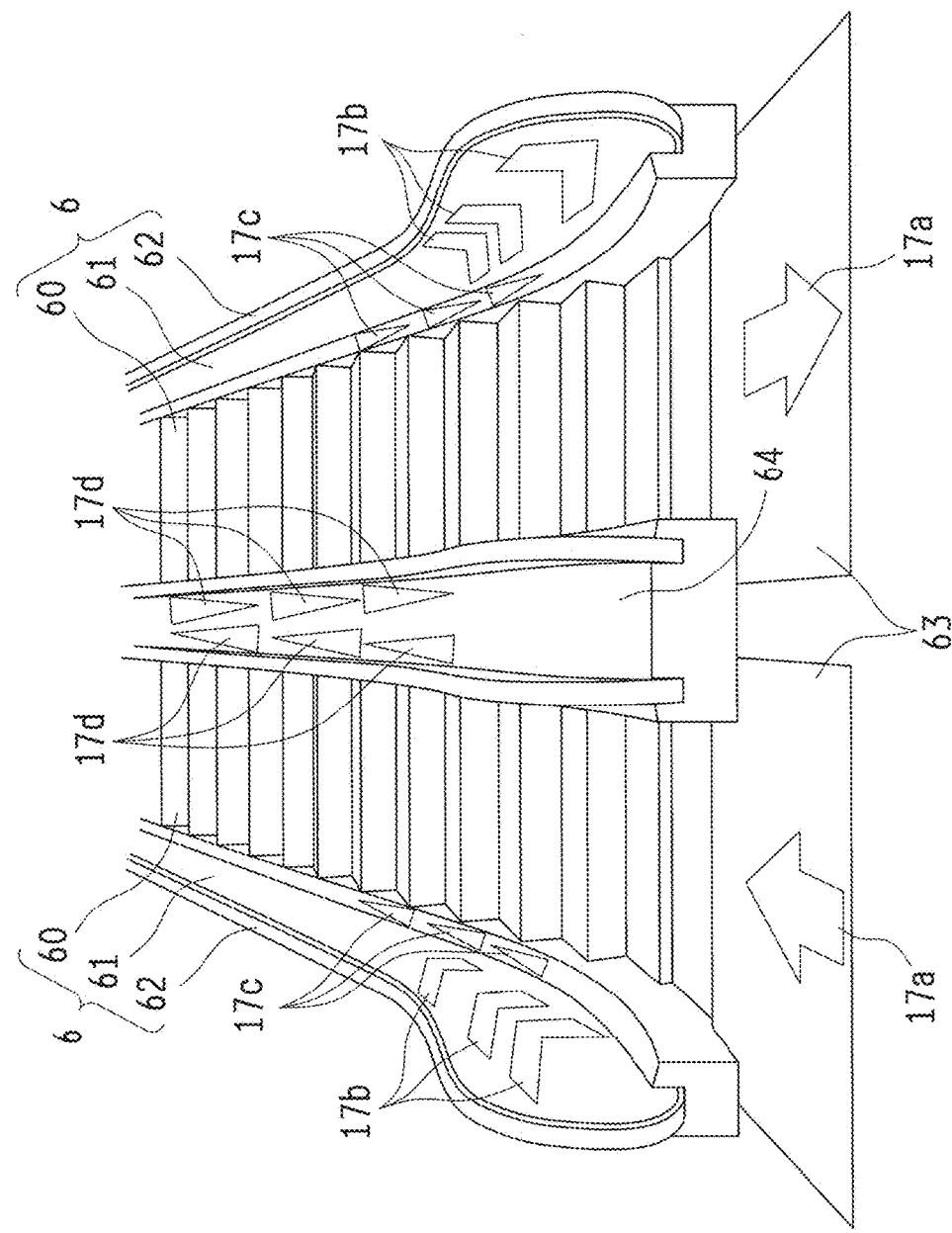
FIG. 49 is a perspective view schematically illustrating an example of adopting a display system according to one or more embodiments.

FIG. 49 is perspective view schematically illustrating an example of adopting the display system according to one or more embodiments. FIG. 49 illustrates various embodiments of the image 17 that may be presented in an escalator system. The image 17 may be shown not only in locations cited in previously described examples, but also in various other locations when the display system is adopted as an escalator system. FIG. 49 illustrates an example where ascending and descending escalators are combined. An image 17 may be presented at the inner panels 61 of the escalator unit 6, the upper surface of the cover plate 63, and a platform part 64 between the two escalators. For example, the inner panels 61 may be configured from transparent light guide plates 11, or configured with transparent light guide plate 11 embedded in a portion of the inner panels 61; hereby, the images 17 presented appeared to float in or near the inner panels.

The image 17 may be presented in various forms as above described to thereby improve the design characteristics of the escalator system. Moreover, arrows indicating the direction of traffic, or graphic images such as symbols or characters indicating that traffic is not permitted may be shown as the image 17 thereby enabling a traveler attempting to enter the escalator unit 6 to easily recognize whether or not entry is permitted. In particular, a traveler may attempt to enter the escalator unit 6 by moving around the automatic handrail 62 of the escalator; therefore, for example, presenting a three-dimensional image 17 in the space near the automatic handrail 62 makes the image easy to recognize even if the traveler is distracted. Therefore, an escalator system using a display system according to one or more embodiments is able to improve the design characteristics and improve the convenience and safety of the escalator system by presenting a stereoscopic image in a space. Note that adoption in an escalator system is not limited to a list type escalator; the display system may also be adopted in an escalator system including a horizontal escalator unit 6 that does not have an accompanying lift.

Elevator Systems

Figure 50:
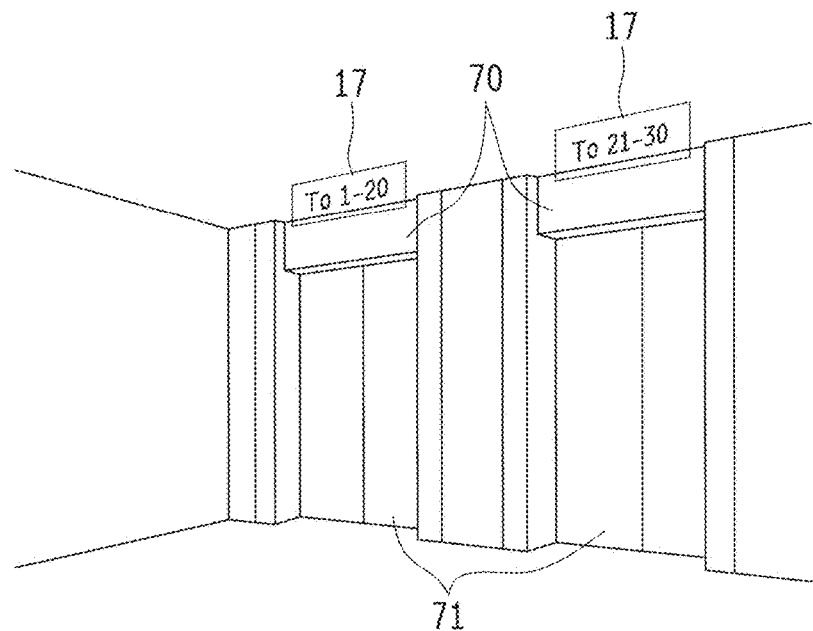
FIG. 50 is a perspective view schematically illustrating an example of adopting a display system according to one or more embodiments.

An example of adopting a display system equipped with the above described display device 1 in an elevator system including a lift device is described. FIG. 50 is perspective view schematically illustrating the external features of an example of adopting the display system according to one or more embodiments. FIG. 50 illustrates the movement system adopted as an elevator system. The elevator system depicted in FIG. 50 is one type of system provided with a lift device such as an elevator. The elevator system is provided with a cage which is the portion of the lift device that travelers board in order to move up or down. The cage is an area designated for movement. In FIG. 50 the elevator system is depicted from the viewpoint of a boarding location, which is an area in front of the cage for entering the cage. The boarding location includes a jamb 70 through which travelers enter, with the boarding doors 71 arranged to open and close to the left and right inside the jamb 70. The floors at which the elevators stop i.e., "TO 1-20", and "TO 21-30" are shown above the jamb 70. In the example illustrated in FIG. 50, the light guide plate 11 in the display device 1 (neither are shown) is arranged above the jamb 70; the display indicating the stopped floor is presented by forming the image 17 as a stereoscopic image with the light emitted from the light guide plate 11. That is, the display indicating the stopped floor is presented as a three-dimensional image 17 that appears to protrude from above the jamb 70. Hereby, the design characteristics and visibility of the display improves.

Figure 51:
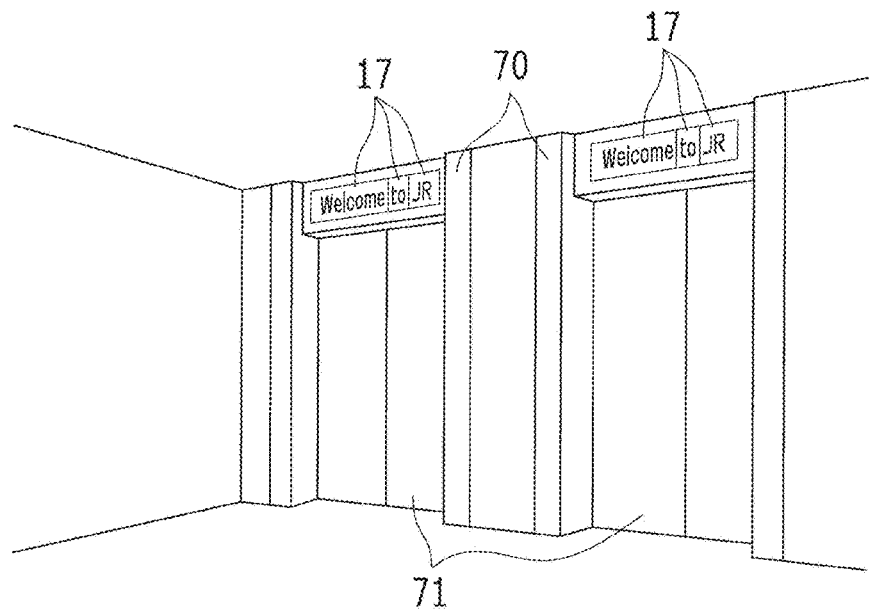
FIG. 51 is a perspective view schematically illustrating an example of adopting a display system according to one or more embodiments.

FIG. 51 is perspective view schematically illustrating an example of adopting the display system according to one or more embodiments. FIG. 51 is another configuration example of the elevator system illustrated in FIG. 50; here, the stereoscopic image of three words "Welcome", "two", and "JR" are shown above the jamb 70. While the three words may be presented simultaneously, the system may be configured to use different light guide plates 11 for the presentation, thereby making it possible to present an effect where the three words appear to float in sequence above the jamb 70.

Figure 52:
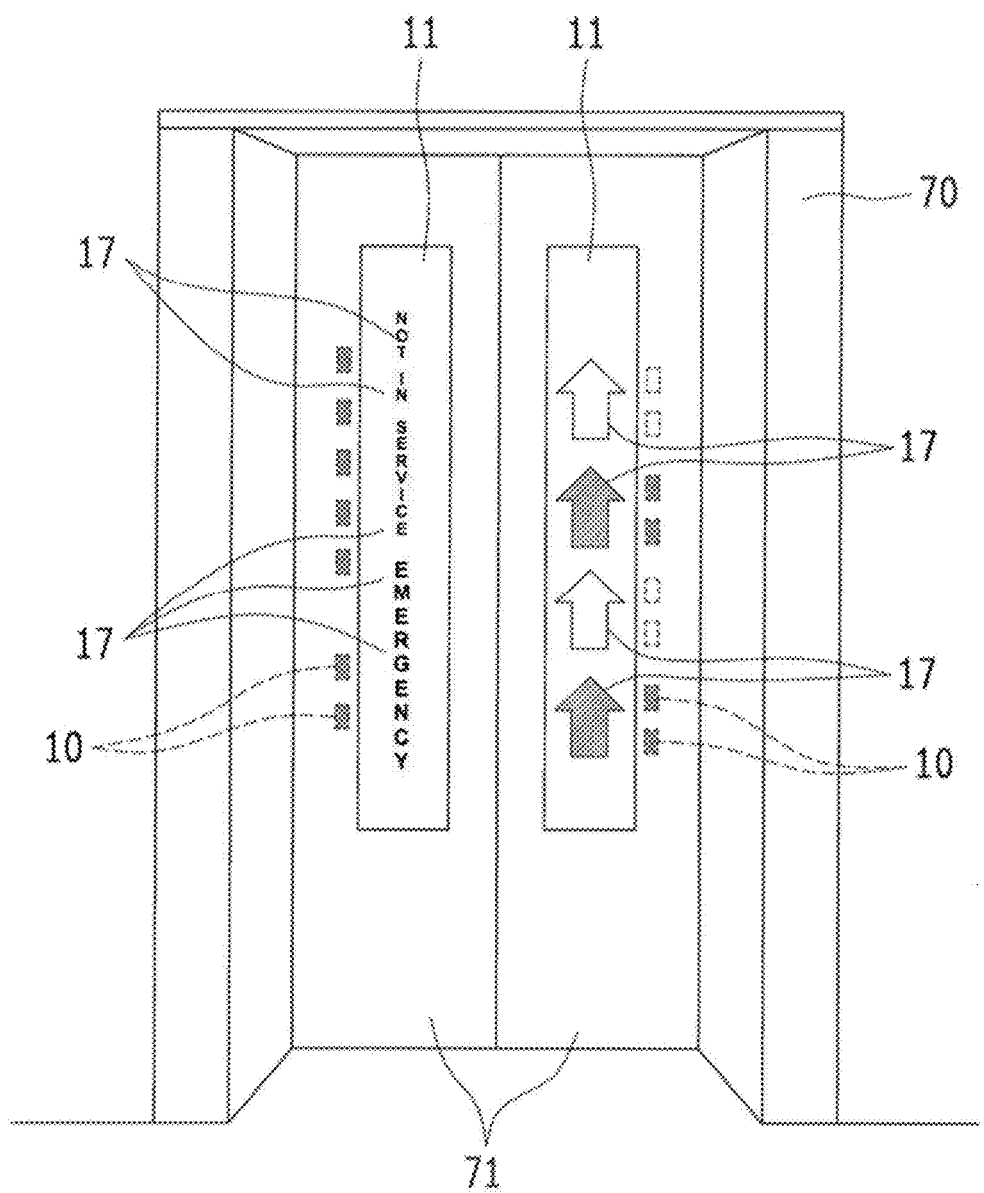
FIG. 52 is a front view schematically illustrating an example of adopting a display system according to one or more embodiments.

FIG. 52 is front view schematically illustrating an example of adopting the display system according to one or more embodiments. FIG. 52 illustrates an example where the display device 1 is embedded in the left and right opening boarding doors 71 inside the jamb 70. Light guide plates 11 are arranged near the center of each of the left and right boarding doors 71. Light sources 10 are embedded next to the light guide plates 11 and are depicted schematically using hidden (dotted) lines. A transparent glass panel is formed near the center of the boarding doors 71 with the light guide plate 11 stacked with the glass panel. The transparent glass panel itself may form the light guide plate 11. The light guide plate 11 arranged in the boarding doors 71 can, for instance, present various images 17 as stereoscopic images, such as an image 17 of an arrow or the like indicating the movement direction of the cage, or phrases such as "NOT IN SERVICE" and "EMERGENCY" indicating that the elevator system cannot be used. The light sources 10 emitting light and images 17 presented are shaded in the drawing. The light sources 10 not emitting light and the images 17 not being shown are rendered white on black. Various images 17, for instance an image 17 indicating the movement direction of the elevator, and an image 17 indicating the elevator cannot be used, may be selectively presented by stocking light guide plates 11 and causing the corresponding light source 10 to emit light as appropriate. Boarding doors 71 thusly configured with the light guide plates 11 of the display device 1 arranged therein improve the design characteristics and visibility of the elevator system.

Figure 53:
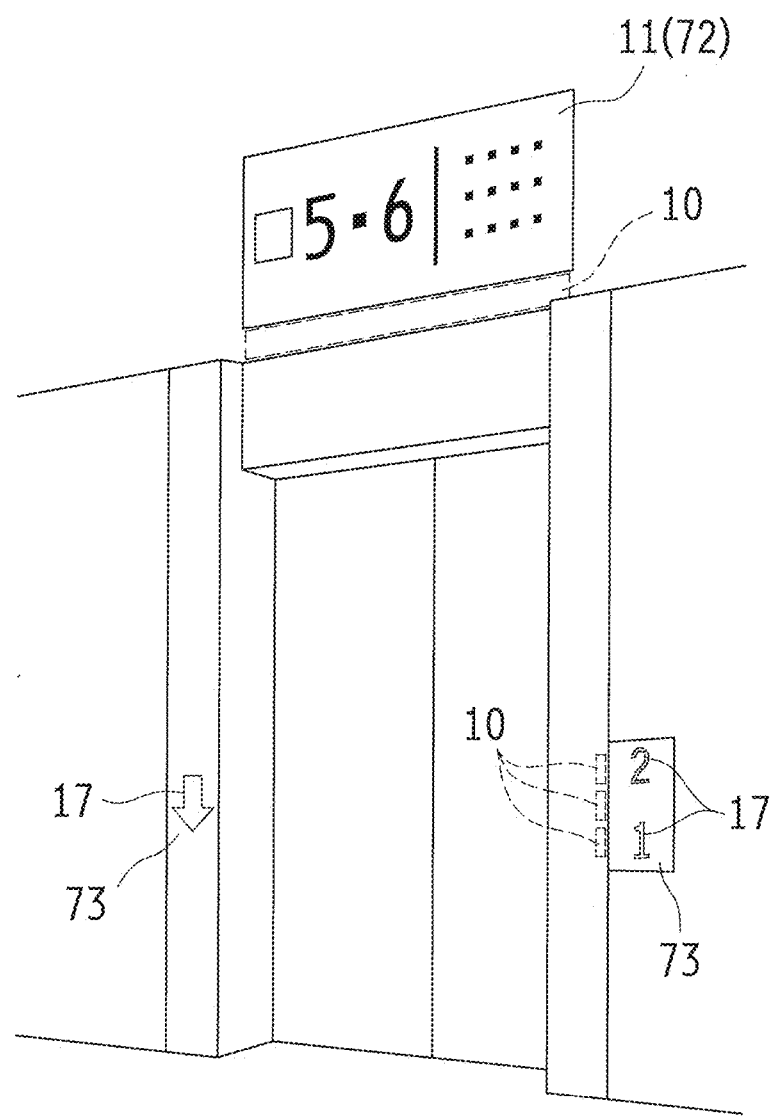
FIG. 53 is a perspective view schematically illustrating an example of adopting a display system according to one or more embodiments.

FIG. 53 is perspective view schematically illustrating an example of adopting the display system according to one or more embodiments; FIG. 3 illustrates an example where the display device 1 is arranged above and next to the jamb 70. In this example, a transparent light guide plate 11 is stacked with a typical display panel 72 that describes the floor number for the train platform and the destination; the display panel 72 is arranged above the jamb 70. The light source 10 is embedded below the light guide plate 11. A display device 1 is also adopted in a boarding position indicator 73 next to the jamb 70. the boarding position indicator 73 displays the current position and the traveling direction of the cage.

Figure 54:
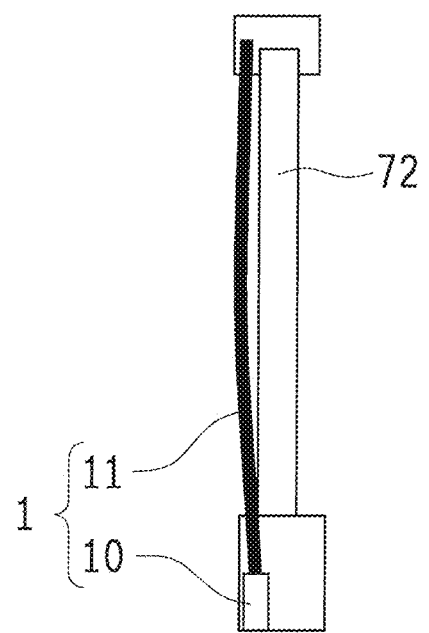
FIG. 54 is a diagram schematically illustrating a portion of the internal structure of an elevator system provided to a display system according to one or more embodiments.

FIG. 54 schematically illustrates a portion of the internal structure of an elevator system provided to the display system according to one or more embodiments. FIG. 54 illustrates an example where a display device 1 is arranged above the jamb 70 in the elevator system depicted in FIG. 53. FIG. 54 depicts the front side, which is the boarding location direction (where a traveler would be at the boarding location) at the left side when facing the drawing. As illustrated in FIG. 54, the light guide plate 11 in the display device 1 is stacked on the front surface of the display panel 72 which includes description such as the floor for the train platform and the like, and the light source 10 is arranged below the display panel 72. The light guide plate 11 is transparent, therefore when the light source 10 is not emitting light, a traveler at the boarding location can see the information described on the front surface of the display panel 72. The light source 10 may emit light whereby the light guide plate 11 changes the path of light incident from the light source 10 to present an image 17 as a stereoscopic image towards the traveler. For instance, the light guide plate 11 may present an image 17 of the phrase "Train bound for XYZ is arriving". Hereby, the system may be configured such that information such as the floor for the train platform can always be seen, and information indicating a particular state is presented when a predetermined event occurs such as the arrival of a train, or the like. Accordingly, the configuration improves the design characteristics, and convenience features of the elevator system.

Figure 55A:
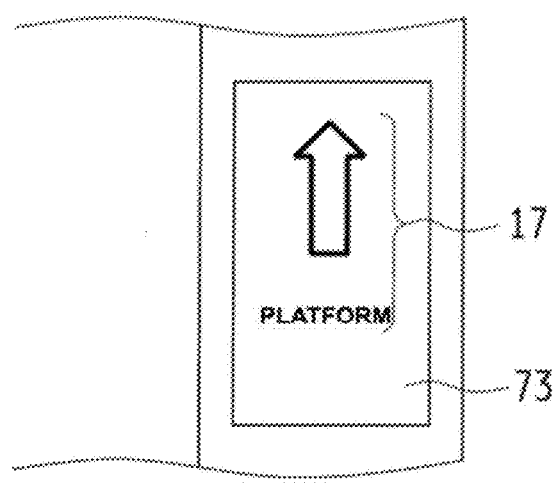
FIG. 55A is a front view schematically illustrating an example of adopting a display system according to one or more embodiments.
Figure 55B:
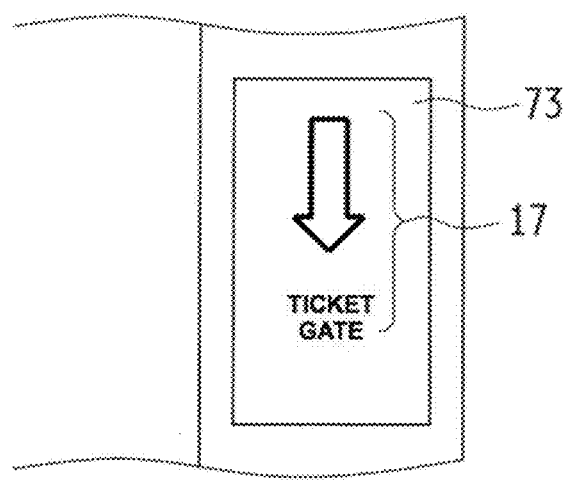
FIG. 55B is a front view schematically illustrating an example of adopting a display system according to one or more embodiments.
Figure 56A:
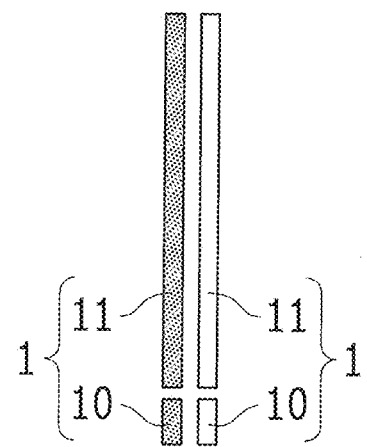
FIG. 56A is a diagram schematically illustrating a portion of the internal structure of an elevator system provided to a display system according to one or more embodiments.
Figure 56B:
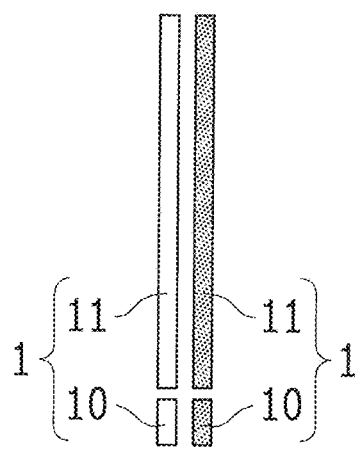
FIG. 56B is a diagram schematically illustrating a portion of the internal structure of an elevator system provided to a display system according to one or more embodiments.

FIGS. 55A and 55B are front views schematically illustrating an example of adopting the display system according to one or more embodiments. FIGS. 56A and 56B schematically illustrate a portion of the internal structure of an elevator system provided to the display system according to one or more embodiments. FIGS. 55A and 55B illustrate examples where a display device 1 adopted in a boarding position indicator 73 is arranged next to the jamb 70 in the elevator system depicted in FIG. 53; the display device 1 is illustrated as presenting an image. FIGS. 56A and 56B also illustrate examples where a display device 1 is arranged in the boarding position indicator 73 in the elevator system depicted in FIG. 53. FIGS. 56A and 56B depict the front side, which is the boarding location direction (where a traveler would be at the boarding location) at the left side when facing the drawing. The light source 10 that is emitting light and the light guide plate 11 onto which light is incident are shaded in the drawings. FIG. 55A illustrates the images presented, namely of the word "Platform" indicating the current position of the cage and of an upward arrow indicating that the cage is ascending. FIG. 56A illustrate the emission state and the light guiding state of the light source 10 and the light guide plate 11 when the system is in the state illustrated in FIG. 55A. FIG. 55B illustrates the images presented, namely of the word "Ticket Gate" indicating the current position of the cage and of a downward arrow indicating that the cage is descending. FIG. 56B illustrate the emission state and the light guiding state of the light source 10 and the light guide plate 11 when the system is in the state illustrated in FIG. 55B. The two light guide plates 11 are stacked in the display device 1 and at least the light guide plate 11 facing front is made of a transparent material.

A conventional boarding position indicator 73 includes the number of indicator lamps required for presenting the required information, Where the indicators represents the current position and travel direction of the cage. For instance, in order to present the states depicted in FIGS. 55A and 55B using a conventional boarding position indicator 73, the indicators presenting the words "Platform", "Ticket Gate", the up arrow, and the down arrow must be arranged in the boarding position indicator 73 and selectively illuminated. However, in the case of adopting a display device 1 according to one or more embodiments, the light guide plate 11 presenting each type of information may be stacked and the light sources 10 selected to emit light as illustrated in FIGS. 55A and 55B, and in FIGS. 56A and 56B; hereby, the entire surface in the display area of the boarding position indicator 73 may be used to selectively present each type of information. Accordingly, if the display area of the boarding position indicator 73 is limited, a conventional boarding position indicator 73 can only present some information. However, with a display device 1 according to one or more embodiments, large and readily perceivable information may be presented as an image 17 on the boarding position indicator 73. In other words, the configuration improves the design characteristics, and convenience features of the elevator system. This is remarkably effective as the amount of information that needs to be presented increases, e.g., the greater the number of floors.

Figure 57A:
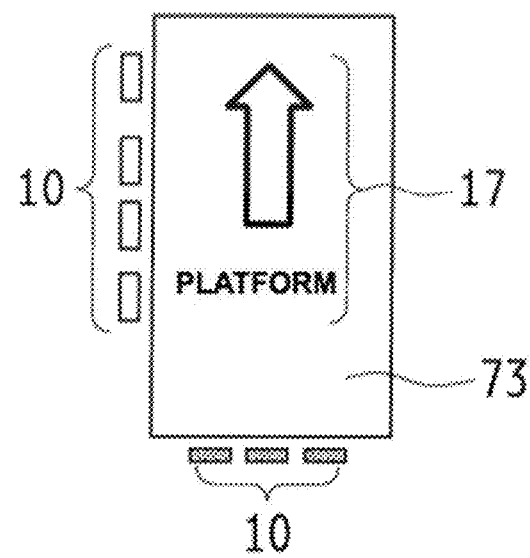
FIG. 57A is a diagram schematically illustrating an example configuration of an elevator system provided to a display system according to one or more embodiments.
Figure 57B:
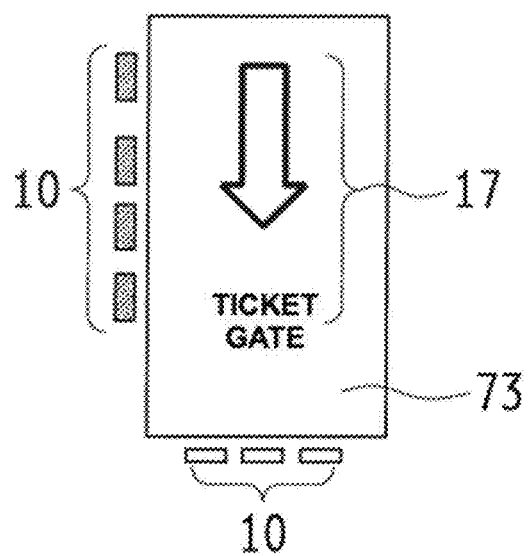
FIG. 57B is a diagram schematically illustrating an example configuration of an elevator system provided to a display system according to one or more embodiments.

FIGS. 57A and 57B schematically illustrate example configurations of an elevator system provided to the display system according to one or more embodiments. FIGS. 57A and 57B illustrate another method of achieving the presentation of the image 17 illustrated in FIGS. 55A and 55B and differs from the method illustrated in FIGS. 56A and 56B. FIG. 57A illustrates the emission states of the light sources 10 in the state illustrated in FIG. 55A. FIG. 57B illustrates the emission states of the light sources 10 in the state illustrated in FIG. 55B. In the embodiment illustrated in FIGS. 57A and 57B light source is 10 are arranged at the site and at the lower part of a single light guide plate 11; light emitted from the light source is 10 enter the light guide plate 11 from the orthogonal. That is, a plurality of groups of light sources is arranged relative to a light guide plate 11 and the light emitted from the groups of light sources 10 enter the light guide plate 11 oriented in different directions. Within the light guide plate 11 a plurality of groups of light focusing portions 15 are formed relative to light emitted from the groups of light sources 10. The light focusing portions 15 includes a group of like focusing portions 15 formed along a line 16 extending in one direction, and a group of light focusing portions 15 formed along a line 16 extending in another direction; the direction of the line 16 corresponding to the groups meet at a given angle such as at right angles or the like. That is, a rectangular light guide plate 11 includes a group for a line 16 extending along the long side and a group for a line 16 extending along the short side, with groups of light focusing portions 15 formed along the line 16 corresponding to the group. The light focusing portions 15 formed on the line 16 extending along the long side of the light guide plate 11 causes the light emitted from the group of light sources 10 arranged along the side of the light guide plate 11 to exit to the outside, and the light focusing portions 15 formed on the line 16 extending along the short side of the light guide plate 11 causes the light emitted from the group of light sources 10 below the light guide plate 11 to exit to the outside. The light focusing portions 15 thusly formed are able to produce a plurality of images 17 with a single light guide plate 11. Accordingly, the embodiment illustrated in FIGS. 57A and 57B exhibits the effect of improving features such as the design characteristics and the visibility of the elevator system as with the method illustrated in FIGS. 56A and 56B. The density of the light focusing portions 15 in the light guide plate 11 may be sufficiently dispersed to thereby greatly minimize the possibility that the light focusing portions 15 corresponding to the one set of light sources 10 affects the path of light from the other set of light sources.

FIGS. 58A and 58B are front views schematically illustrating an example of adopting the display system according to one or more embodiments. When adopted in an elevator system the display system according to one or more embodiments is not only capable of forming an image at a position visible from the boarding location; the display system may also form an image that is visible from inside an ascending cage. FIGS. 58A and 58B illustrate an example of the display system forming an image at a position that is visible from inside the cage; in this example the display system is adopted in the cage operation panel 74 used to operate the elevator unit. FIG. 58A illustrates an example where a display system according to one or more embodiments is adopted in the cage operation panel 74; FIG. 58B illustrates an example of a conventional cage operation panel 74. In FIGS. 58A and 58B, buttons indicating a destination floor are shown in the cage operation panel 74; in the display system according to one or more embodiments the floor shown is presented as an image 17 which is a stereoscopic image. In this case, the floors may be exhibited in various forms, such as only presenting possible destination floors; this can be expected to improve the design characteristics of the system.

A display system according to one or more embodiments may be adopted in the cage; in this case a light guide plate 11 may be arranged on the glass pane provided as the wall surface of the cage, other walls, or the ceiling in addition to the cage operation panel 74. The light guide plate 11 provided may form a stereoscopic image for various information such as the current position, and the movement direction. The display system may be adopted in elevator systems besides the vertical lift escalator described, such as an elevator where the cage ascends and descends diagonally.

As above described various embodiments of the display system is capable of showing an image 17, e.g., a stereoscopic image as a way of presenting various types of information. Hereby, when adopted in a gate system, the system exhibits superior benefits such as improved eye-catching ability, i.e., the ability to draw the attention of a traveler approaching, entering, passing through, and boarding the gate system. The embodiment exhibits superior benefits such as making it possible to implement a gate system with rich design characteristics.

The display system may be adopted in a movement system that aids the movement of people such as an escalator system, an elevator system, or the like. When adopted in an escalator system, the display system makes information easily visible to a traveler attempting to enter the escalator unit 6. The information is based on the movement direction of the escalator unit 6 and is, for example, whether or not entry into the escalator unit 6 is permitted. Therefore, various features of such an escalator system improve such as the design characteristics, visibility, convenience, and safety. Moreover, when adopted in an elevator system, various features of the elevator system also improve such as the design characteristics, visibility, convenience, and safety.

The present invention is not limited to the above described embodiments and may be implemented in various other ways. Therefore, in all respects the above embodiments are merely examples and should not be interpreted as limitations. The scope of the present invention is delineated by the claims and not limited by the specification. Moreover, all modifications and variations with a scope equivalent to the claims are within the scope of the present invention.

REFERENCE NUMERALS

1 Display device
1a First display device
1b Second display device
10 Light source
100 Refractive portion
101 Aspherical lens
102 Cylindrical lens
103 Reflective portion
104 Reflective plate
105 Joint
11 Light guide plate (light guide element)
12 Incidence end surface
13 Emission surface
14 Rear surface
15 (15a, 15b, . . . , 15x1, . . . , 15y3, 15aa, . . . , 15ba, . . . ) Light focusing portions
150 Reflection surface
16 (16a, 16b, 16c, . . . ) Line
17 Image (three-dimensional image, planar image
P (Pa, Pb, . . . , P1, P2) Convergence points 2 Passage
20 Passage unit
200 Passage enclosure
201 Passage protective plate
3 Gate device
30 Read unit
31 Door unit
32 Housing
33 Detection unit
34 Wall unit
4 Control device
5 Assessment device
50 Display Unit
6 Escalator unit (movement unit)
60 Tread
61 Inner plate
62 Automatic handrail
63 Cover plate
64 Platform unit
70 Jamb
71 Boarding door
72 Display panel
73 Boarding position indicator
74 Cage operation panel

The invention claimed is:

1. A display system arranged in a region designated for entry or movement, the display system comprising:
a display device displaying an image;
the display device comprising:
a light source emitting light; and
a light guide element guiding incident light from the light source;
the light guide element comprising:
an emission surface outputting the incident light; and
a plurality of light focusing portions changing a path of the incident light toward the emission surface, causing the incident light output to converge toward a convergence point or convergence line outside the light guide element or to radiate from a convergence point or convergence line outside the light guide element and thereby form the image outside the light guide element.

2. The display system according to claim 1, wherein:
the light guide element forms the image so that the image is visible at a position prior to entering the region.

3. The display system according to claim 2, wherein:
the light guide element forms the image indicating whether entry into the region is permitted.

4. The display system according to claim 2, further comprising:
an assessment device for determining whether passage through the region is permitted; wherein
the assessment device comprises:
a reader that acquires information needed for assessing whether passage is permitted; and
the light guide element is arranged overlapping the reader.

5. The display system according to claim 1, wherein:
the light guide element forms the image so that the image is visible from a position in the region.

6. The display system according to claim 5, further comprising:
an assessment device for determining whether passage through the region is permitted; wherein
the light guide element forms the image representing a determination result from the assessment device.

7. The display system according to claim 1, wherein the display system further comprises:
a plurality of the display devices;
a first light guide element in a first display device forms a first image so that the first image is visible at a position prior to entering the region;
a second light guide element in a second display device forms a second image so that the second image is visible from a position in the region; and
an assessment device for determining whether passage through the region is permitted; wherein
the assessment device comprises a reader that acquires information needed to assess whether passage is permitted;
the first light guide element is arranged overlapping the reader; and
the second light guide element forms the second image representing a determination result from the assessment device.

8. The display system according to claim 1, further comprising:
a detector detecting an approach of a detection object; wherein
the light source emits the light when the detector detects the approach of a person.

9. The display system according to claim 1, wherein:
the display device is provided with a plurality of light guide elements; and
the plurality of light guide elements form mutually different images.

10. The display system according to claim 1, wherein:
the light guide element is arranged in the region.

11. The display system according to claim 1, further comprising:
a door unit provided in the region; wherein
the light guide element is arranged in the door unit.

12. The display system according to claim 1, wherein:
the light guide element is a thin film and is bent.

13. The display system according to claim 1, wherein:
the region comprises a passage; and
the display system further comprises a gate device provided at a boundary of the passage on one or both sides of the passage.

14. The display system according to claim 13, wherein:
the light guide element is arranged in the gate device.

15. The display system according to claim 13, wherein:
the gate device comprises a wall unit arranged parallel to a travel direction through the region and standing orthogonal to a floor surface; and
the wall unit is formed using the light guide element.

16. The display system according to claim 15, wherein:
the wall unit is transparent or semi-transparent.

17. The display system according to claim 1, wherein:
the region contains a lift-type or horizontal type moving unit that comprises an endless crawler driven tread, inner panels arranged on both sides in a movement direction of the tread, and endless crawler driven automatic handrails that travel around the inner panels.

18. The display system according to claim 17, wherein:
the light guide element is arranged below the automatic handrails.

19. The display system according to claim 17, wherein:
the light guide element is arranged along a surface curved in the movement direction of the automatic handrail.

20. The display system according to claim 17, wherein:
the inner panels are formed using the light guide element.

21. The display system according to claim 1, wherein:
the region comprises a lift device.

22. A display system arranged in a region designated for entry or movement, the display system comprising:
- a display device that shows an image;
- the display device comprising:
  - a light source that emits light; and
  - a light guide element that guides incident light from the light source;
- the light guide element comprising:
  - an emission surface that outputs the incident light; and
  - an optical-path changing portion that changes an optical path of incident light toward the emission surface; wherein
- the optical-path changing portion changes the optical path toward a location prior to entering the region or toward a location in the region.

23. A gate device arranged on one or both sides of a passage as a boundary of the passage, the gate device comprising:
- a display device that shows an image;
- the display device comprising:
  - a light source that emits light; and
  - a light guide element that guides incident light from the light source;
- the light guide element comprising:
- an emission surface that outputs the incident light; and
- a plurality of light focusing portions that change a path of the incident light toward the emission surface, causing the incident light output to converge toward a convergence point or convergence line outside the light guide element or to radiate from a convergence point or convergence line outside the light guide element and thereby form the image outside the light guide element.

* * * * *